United States Patent [19]
Honma et al.

[11] Patent Number: 6,080,249
[45] Date of Patent: Jun. 27, 2000

[54] METHOD FOR ADHERING A MEMBER AND APPARATUS FOR ADHERING A MEMBER

[75] Inventors: Tsutomu Honma; Yoshiaki Yanagida, both of Kawasaki, Japan

[73] Assignee: Fujitsu Limited, Kawasaki, Japan

[21] Appl. No.: 08/990,934

[22] Filed: Dec. 15, 1997

[30] Foreign Application Priority Data

Apr. 8, 1997 [JP] Japan .................................. 9-089107

[51] Int. Cl.[7] .............................. B32B 31/00; B05B 5/00; B05C 1/00; G11B 5/127
[52] U.S. Cl. ........................... 156/64; 156/356; 156/357; 156/578; 118/241; 118/323; 118/668; 118/677; 118/679; 118/680; 29/603.04; 29/603.07; 29/603.17; 29/603.2; 29/603.22
[58] Field of Search .............................. 156/64, 153, 356, 156/357, 578; 29/603.01, 603.04, 603.05, 603.06, 603.17, 603.2, 603.27; 118/323, 241, 242, 256, 668, 669, 677, 676, 679, 680, 681, 682

[56] References Cited

U.S. PATENT DOCUMENTS

| | | |
|---|---|---|
| 3,682,131 | 8/1972 | Algeri et al. ................................. 118/2 |
| 3,821,815 | 6/1974 | Abbott et al. . |
| 4,010,203 | 3/1977 | Aylon ....................................... 156/578 |
| 4,457,114 | 7/1984 | Hennenfent et al. . |
| 4,511,283 | 4/1985 | Duval et al. ............................. 404/107 |
| 4,511,942 | 4/1985 | Valstyn . |
| 4,675,986 | 6/1987 | Yen . |
| 4,689,877 | 9/1987 | Church . |
| 4,708,292 | 11/1987 | Gammons ............................... 239/414 |
| 4,841,625 | 6/1989 | Valstyn . |
| 4,861,398 | 8/1989 | Fukuoka et al. . |
| 4,912,883 | 4/1990 | Chang et al. . |
| 4,914,868 | 4/1990 | Church et al. . |
| 5,023,991 | 6/1991 | Smith . |
| 5,065,483 | 11/1991 | Zammit . |
| 5,095,613 | 3/1992 | Hussinger et al. ........................ 29/603 |
| 5,117,589 | 6/1992 | Bischoff et al. . |
| 5,203,119 | 4/1993 | Cole . |
| 5,214,589 | 5/1993 | Tang . |
| 5,356,050 | 10/1994 | Hahn et al. .............................. 222/394 |

FOREIGN PATENT DOCUMENTS

| | | |
|---|---|---|
| 60-43215 | 3/1985 | Japan . |
| 60-108267 | 6/1985 | Japan . |
| 63-288413 | 11/1988 | Japan . |

*Primary Examiner*—Curtis Mayes
*Assistant Examiner*—J. A. Lorengo
*Attorney, Agent, or Firm*—Greer, Burns & Crain, Ltd.

[57] ABSTRACT

A method for adhering a member and an apparatus for adhering the member to a base is useful for preventing warping of the member and non-uniformity of the strength of adhesion. After the adhesive application unit is positioned at a first position at a fixed distance from an initial application position of the base, movement of the unit is started from the first position with the moving unit while the action of discharging adhesive of the application unit is started. Next, the action of discharging adhesive of the application unit is completed at the final application position of the base and the movement is stopped at a second position at a fixed distance from the final application position of the base. This results in movement of the application unit at a constant speed from the initial application position to the final application position of the block. Therefore, non-uniformity of the adhesive layer at the initial application position and the final application position of the block can be prevented.

20 Claims, 21 Drawing Sheets

FIG. 15
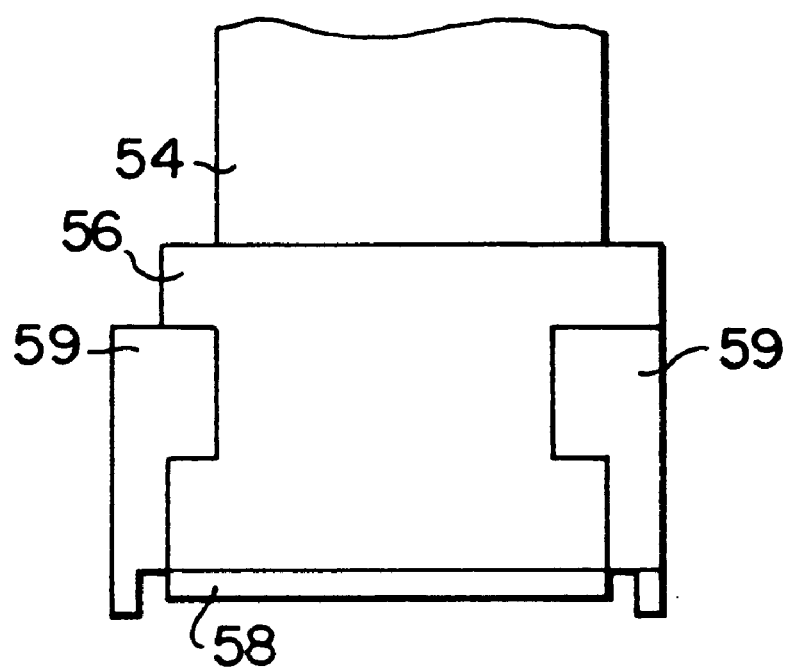
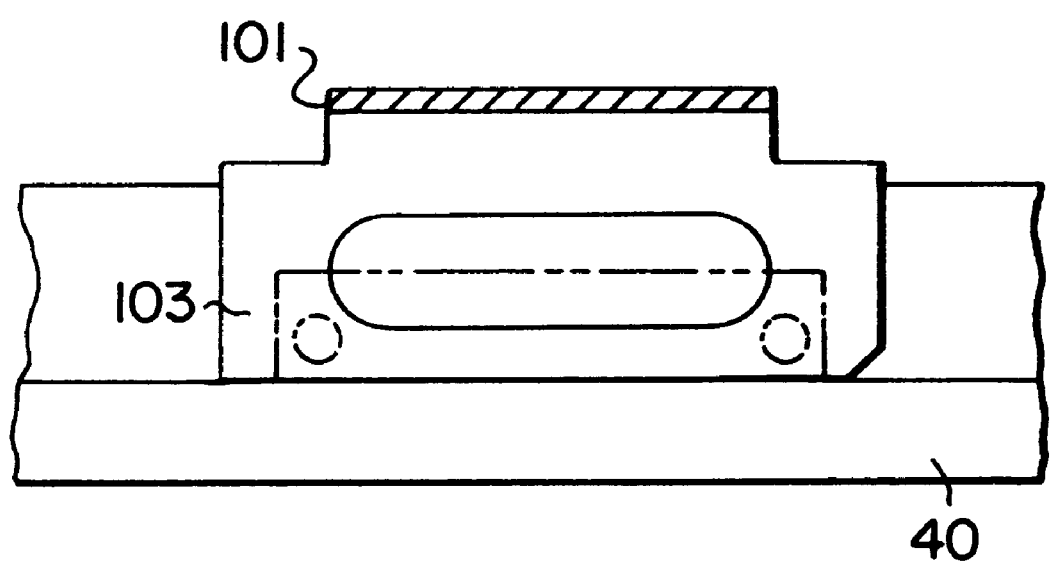

METHOD FOR ADHERING A MEMBER AND APPARATUS FOR ADHERING A MEMBER

BACKGROUND OF THE INVENTION

1. Field of the Invention

The present invention relates to a method for adhering a member and an apparatus for adhering a member to a base; especially a method for adhering a thin member and an apparatus for adhering a thin member to a base with a high degree of precision.

2. Description of the Related Art

For example, a process to manufacture magnetic heads includes a process to adhere a thin film magnetic head to a work piece. In the adhesion of these thin film magnetic heads, a high precision positioning and a uniform adhesive strength are necessary in order for a subsequent lapping. However, the thin film magnetic head is affected by the adhesive because it is very thin and it is difficult to satisfy such requirements.

Consequently, technology to adhere a member to a base with a high degree of precision and with good adhesive strength is required.

FIG. 25A and FIG. 25B are figures to explain composite magnetic heads.

As shown in FIG. 25A, the composite magnetic heads comprise a write element 85 and a magnetoresistive element 82 formed on a substrate 81. The magnetoresistive element 82, as shown in FIG. 25B, comprises a magnetoresistive film 83 and a pair of conducting films 84. The magnetoresistive element 82 is an element for which the value of resistance changes due to an external magnetic field. The magnetoresistive element 82 is a read element to output current of a size corresponding to the magnetic force of a track 90 of a magnetic disk.

Because the magnetoresistive element 82 is an element which can only read, it must have a write element installed separately. The write element 85 is constituted of an inductive head. The write element 85 comprises a lower magnetic pole 86 and an upper magnetic pole 88 which faces the lower magnetic pole 86 across a gap. A coil 87 to excite these magnetic poles 86 and 88 is installed between these magnetic poles 86 and 88. A non-magnetic insulating layer 89 is installed around the periphery of the coil 87.

In such a composite magnetic head, the value of resistance of the magnetoresistive film 83 of the magnetoresistive element 82 must be constant in each head. However, it is difficult to produce the films with a constant value of resistance in the process for manufacturing the thin film of the magnetic heads. For this reason, after forming the thin film of the magnetic heads, the height (amplitude) h of the magnetoresistive film 83 is finished to a constant value and the values of resistance are made constant.

FIGS. 26A, 26B, 26C, 27A, 27B, 27C and 27D are figures to explain the manufacturing process for such composite magnetic heads.

As shown in FIG. 26A, a plurality of composite magnetic heads 101 are formed on a wafer 100 with thin film technology. Next, as shown in FIG. 26B, the wafer 100 is cut and a row-bar 101 is prepared. This row-bar 101 comprises one row of magnetic heads 102.

The magnetic heads 102 undergo lapping at a constant height of the magnetoresistive film 83, as discussed above. However, the row-bar 101 is very thin, for example it is 0.3 millimeters. For this reason, it is difficult to mount it directly on the lapping jig. For this reason, as shown in FIG. 26C, the row-bar 101 is adhered on a mounting jig (base) 103 with heat-melting wax.

Then, as shown in FIG. 27A, the row-bar 101 is placed on the lap surface plate 104 and undergoes lapping. The height of the magnetoresistive film 83 is thereby made constant. Then, as shown in FIG. 27B, a slider is formed on the lower surface 101-1 of the row-bar 101.

Then, as shown in FIG. 27C, the row-bar 101 is cut into individual magnetic heads 102 while still mounted on the mounting jig 103. Then, as shown in FIG. 27D, the individual magnetic heads 102 are released while the mounting jig 103 is heated and the heat-melting wax is melted.

In this way, a row-bar 101 comprising a row of magnetic heads 102 is prepared and a plurality of magnetoresistive film of magnetic heads 102 can undergo lapping at one time because lapping is applied at the level of the row-bar 101.

Because lapping is applied at the level of the row-bar 101 comprising a plurality of magnetic heads, the row-bar 101 must be adhered with good precision to the mounting jig 103. In other words, the precision in micron units for positioning and lapping with respect to the mounting jig 103 is required.

FIG. 28A and FIG. 28B are diagrams to explain the prior art.

Conventionally, a row-bar 101 is mounted on and adhered to a heated mounting jig 103 after heated heat-melting wax is applied by hand.

Meanwhile, a mechanism for applying adhesive is also known. As shown in FIG. 28A, dots of adhesive 105 are applied automatically on a base 103 with an application mechanism. Then the member 101 is placed thereon.

Also, as shown in FIG. 28B, lines of adhesive 106 are automatically applied on a base 103 with the application mechanism moving from the starting end to the finishing end of the base 103. Then the member 101 is placed thereon.

However, the member conforms to the adhesive in the case of adhering a very thin member, of 1 mm or less, such as the row-bar. For this reason, in the conventional, manual method, the problems are that there are non-uniformity of the thickness of the adhesive layer, great warping of the member, and non-uniformity of the adhesive strength.

Also, in the method with an application mechanism to effect spot application, the problems are that there are great warping of the member and non-uniformity of adhesive strength due to the non-uniformity of the thickness of the adhesive layer because of the dots of adhesive.

Furthermore, in the method with an application mechanism to effect line application, non-uniformities in the adhesive layer occur easily at the starting and ending points on the base 103 as shown in FIG. 28B. For this reason, the problems are great warping of the member and non-uniformity of adhesive strength.

Moreover, there are problems of the member conforming to the adhesive, warping of the member, and low precision of positioning because the member is simply placed on the base 103 on which adhesive was applied.

SUMMARY OF THE INVENTION

It is an object of the present invention to provide a method for adhering a member and an apparatus thereof to prevent non-uniformity of adhesive strength and warping of members.

It is another object of the present invention to provide a method for adhering a member and an apparatus thereof to improve the precision of positioning the member.

The present invention is a method for adhering a member to adhere a member on a base by means of an adhesive after applying the adhesive on the base, using means for applying adhesive. First of all, the means for applying adhesive is positioned at a first position at a fixed distance from start application position of the base. Secondly, movement of the means for applying adhesive is started from the start position with the movement means while starting the action of discharging adhesive of the means for applying adhesive. Thirdly, the action of discharging adhesive of the means for applying adhesive is completed at the end application position of the base. Fourthly, the movement is stopped at a second position at a fixed distance from the end application position of the base.

Because in the present invention, the action of discharging adhesive and the movement are started from the first position at a fixed distance from the starting end of the base, the adhesive application means has movement at a constant speed at the starting end of the base. For this reason, the present invention can prevent non-uniformity of the adhesive layer at the starting end of the base. Also, since the adhesive application means stops movement at a second position at a fixed distance from the finishing end of the base after stopping the action of discharging adhesive at the ending position of the base, the adhesive application means has movement at a constant speed at the finishing end of the base. For this reason, the present invention can prevent irregularities in the adhesive layer at the finishing end of the base.

For this reason, the present invention can make the thickness of the adhesive layer uniform. Thereby, the present invention can prevent non-uniformity of the adhesion strength of the member, even in the case of adhering a thin member.

Also, means for applying adhesive applies the adhesive to the base. The linking mechanism moves the member in a complete circuit with respect to the base while pressing the member to the base. Furthermore, the pressing mechanism positions the member while pressing the member to the base.

Since the linking mechanism moves the member in a complete circuit while pressing the member to the base after adhering the member to the base, the present invention can prevent foreign matter, such as air bubbles, in the adhesive layer and can more closely adhere the member to the base. Consequently, the present invention can prevent non-uniformity of the adhesion strength of the member and warping of the member.

Moreover, since the pressing mechanism positions while pressing, the present invention can improve the precision of positioning the member with respect to the base. Furthermore, the present invention can automate the adhesion process and can ensure the safety of the operator.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 15 is a detail of the linking head in FIG. 13;

DESCRIPTION OF THE PREFERRED EMBODIMENTS

Figure 1:
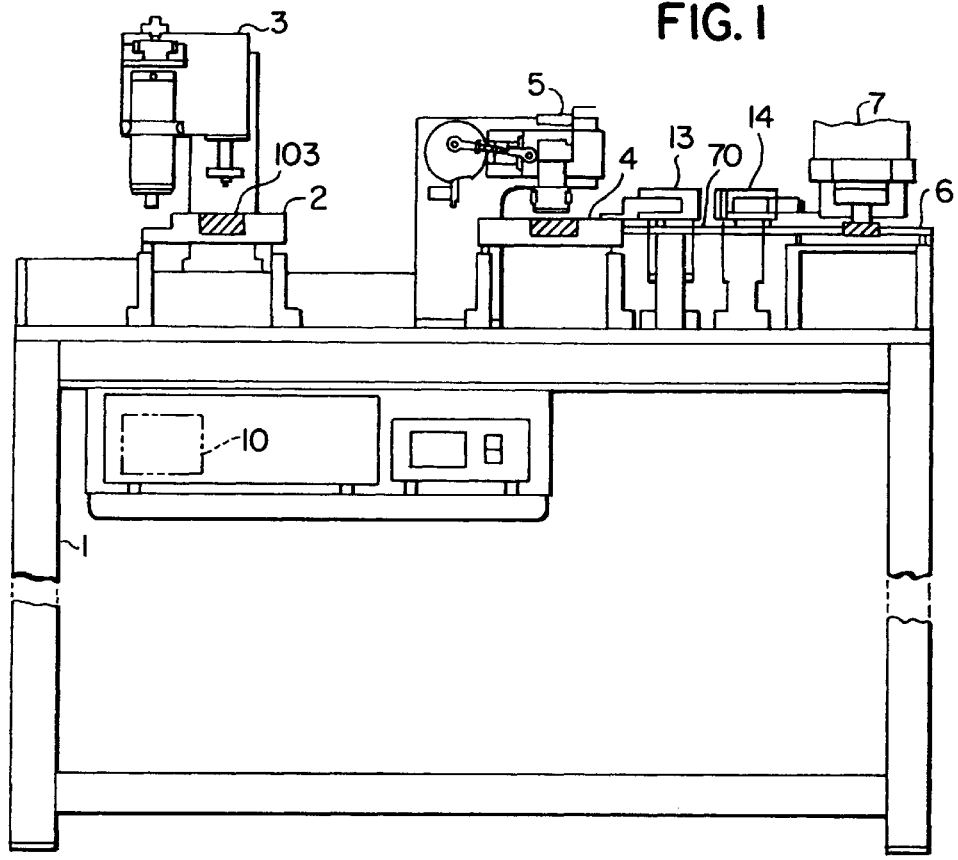
FIG. 1 is a front view of the apparatus for adhering member which is one embodiment of the present invention.
Figure 2:
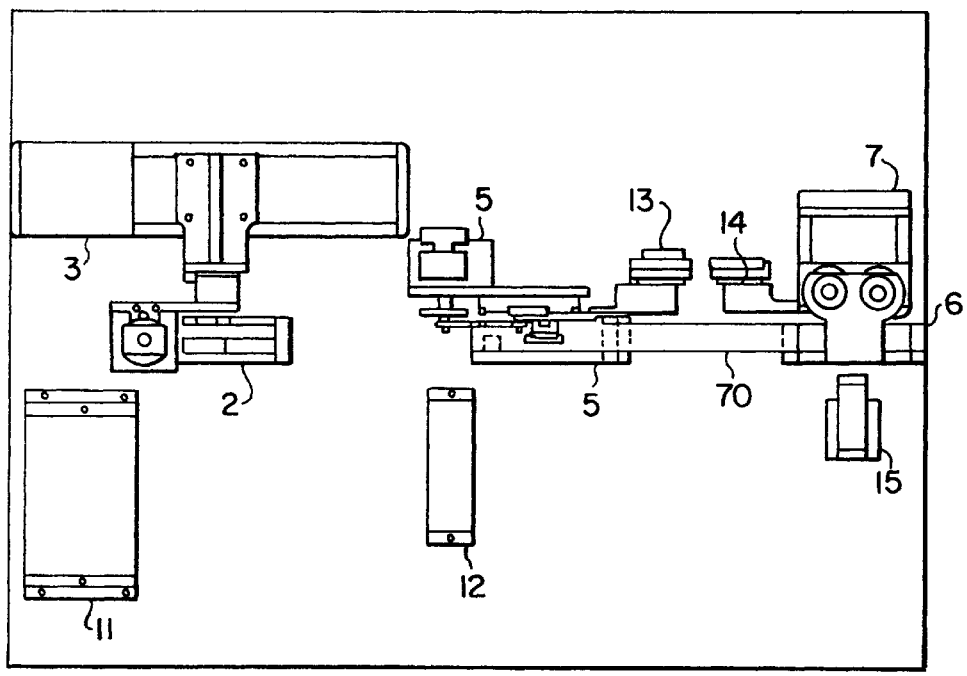
FIG. 2 is a dorsal view of the apparatus for adhering member which is one embodiment of the present invention.
Figure 3:
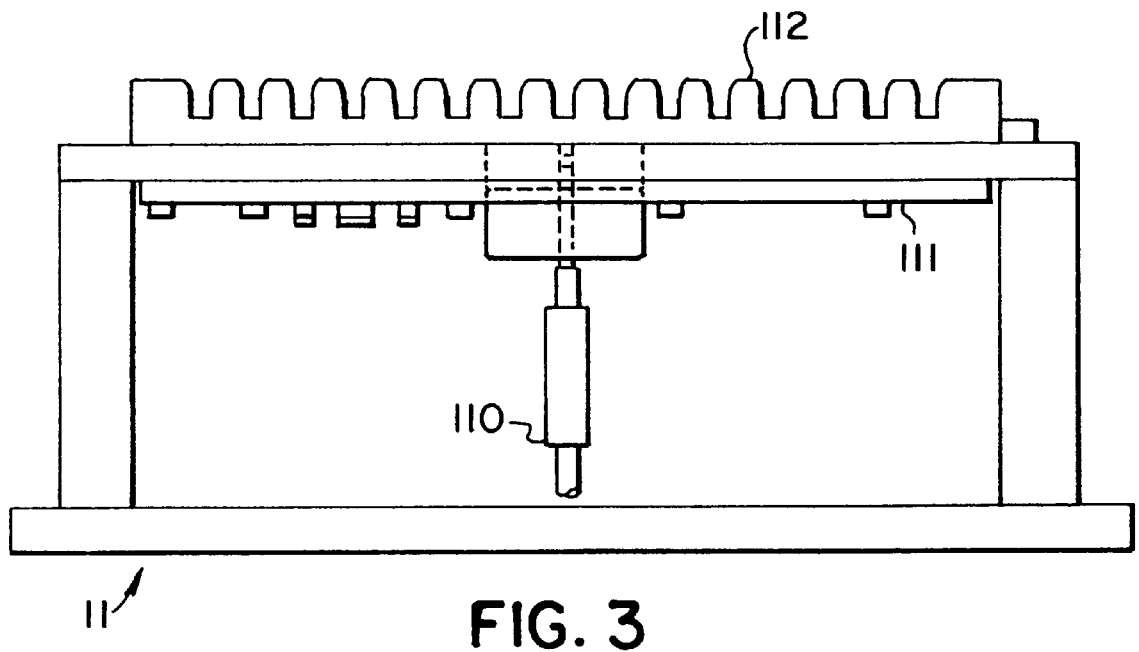
FIG. 3 is a diagram of the constitution of the block preheating platform in FIG. 2.
Figure 4:
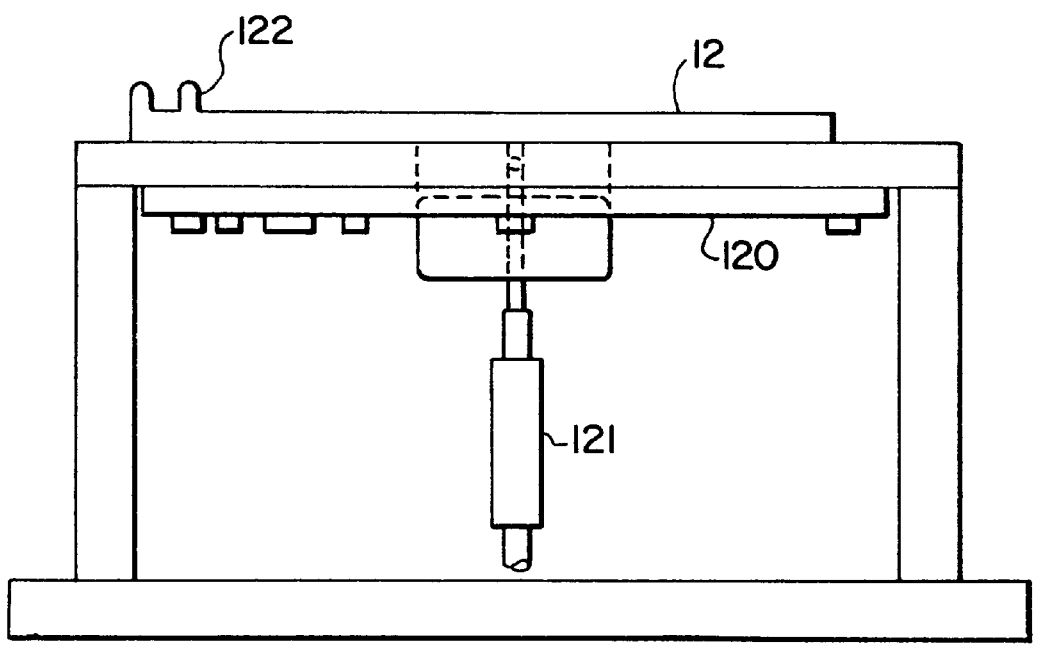
FIG. 4 is a diagram of the constitution of the row-bar preheating platform in FIG. 2.

FIG. 1 is a front view of the apparatus for adhering a member which is one embodiment of the present invention; FIG. 2 is a dorsal view of the apparatus for adhering a member which is one embodiment of the present invention; FIG. 3 is a diagram of the constitution of the block preheating platform in FIG. 2; and FIG. 4 is a diagram of the constitution of the row-bar preheating platform in FIG. 2.

FIG. 1 and FIG. 2 show an apparatus for adhering row-bar, to adhere a row-bar 101 on a block (base) 103, as the apparatus for adhering a member.

As shown in FIG. 1 and FIG. 2, a block preheating platform 11 has the purpose of preheating a block 103. A row-bar preheating platform 12 has the purpose of preheating a row-bar 101. The block 103 is set to a first setting mechanism 2. An application mechanism 3 applies heat-melting wax on the block 103 set in the first setting mechanism 2.

A second setting mechanism 4 is set to the block 103 on which the row-bar 101 is adhered. A linking mechanism 5 moves the row-bar 101, on the block 103 set in the second setting mechanism 4, in a complete circuit. A pushing mechanism 13 pushes the block 103 set in the second setting mechanism 4.

A third setting mechanism 6 is set to the block 103 through the linking mechanism 5. A mechanism 7 for pressing and positioning positions the block 103 set to in the third setting mechanism 6 and presses the row-bar 101 to the block 103. A mechanism 14 for X axis positioning positions the block 103 and row-bar 101 of the third setting mechanism 6 in the direction of the X axis. A mechanism 15 for Y axis positioning positions the row-bar 101 of the third setting mechanism 6 in the direction of the Y axis.

A control circuit 10 is installed below the table 1 and controls the application mechanism 3, the linking mechanism 5, and the mechanism 7 for pressing and positioning. The transfer rail 70 guides the block 103 between the second setting mechanism 4 and the third setting mechanism 6.

As shown in FIG. 3, the block preheating platform 11 comprises a wave-shaped setting platform 112 on which the block 103 is placed, a heater 111 to heat the setting platform 112, and a thermocouple 110. As shown in FIG. 4, the row-bar preheating platform 12 comprises a wave-shaped setting platform 122 on which the row-bar 101 is placed, a heater 120 to heat the setting platform 122, and a thermocouple 121.

The action of this adhesion device is explained. The block 103 is placed on the block preheating platform 11 and heated in advance. Also, the row-bar 101 is placed on the row-bar preheating platform 12 and heated in advance.

An operator removes the preheated block 103 from the block preheating platform 11 and sets it in the first setting mechanism 2. Then the operator presses a switch of the control circuit 10 to operate the application mechanism 3. The application mechanism 3 applies heat-melting wax (adhesive) to the block 103 set in the first setting mechanism 2.

Then, the operator sets the preheated row-bar 101 on the block 103. The operator sets the block 103 on which the row-bar 101 is set in the second setting mechanism 4. Then, the operator presses a switch of the control circuit 10 to operate the linking mechanism 5. The linking mechanism 5 moves the row-bar 101 on the block 103 set in the second setting mechanism 4 in a reciprocating motion with respect to the block 103. At this time, the pushing mechanism 13 pushes the block 103 set in the second setting mechanism 4 so that it does not move.

After that, the operator moves the block 103 on which the row-bar 101 is set along the transfer rail 70 to the third setting mechanism 6. Then, the operator presses a switch of the control circuit 10 to operate the mechanism 7 for pressing and positioning. With the action of pressing and positioning, the mechanism 14 for X axis positioning effects positioning in the direction of the X axis of the block 103 and row-bar 101; the mechanism 15 for Y axis positioning effects positioning in the direction of the Y axis of the row-bar 101 with respect to the block 103. Then, the pressing mechanism 7 pushes and presses the row-bar 101 against the block 103.

Foreign matter in the adhesive layer can be prevented and the row-bar closely sealed to the block 103 with such a constitution, because the linking action to press the row-bar 101 against the block 103 and move in a reciprocating motion is effected after application of the adhesive. Also, this constitution can effect adhesion with high precision of positioning since it positions and presses the row-bar 101 on the block 103.

Moreover, because the actions other than transporting the block 103 are automated, the device can adhere the row-bar 101 to the block 103 with high precision. Moreover, the device can be operated safely even when using a heat-melting adhesive as the adhesive.

Figure 6:
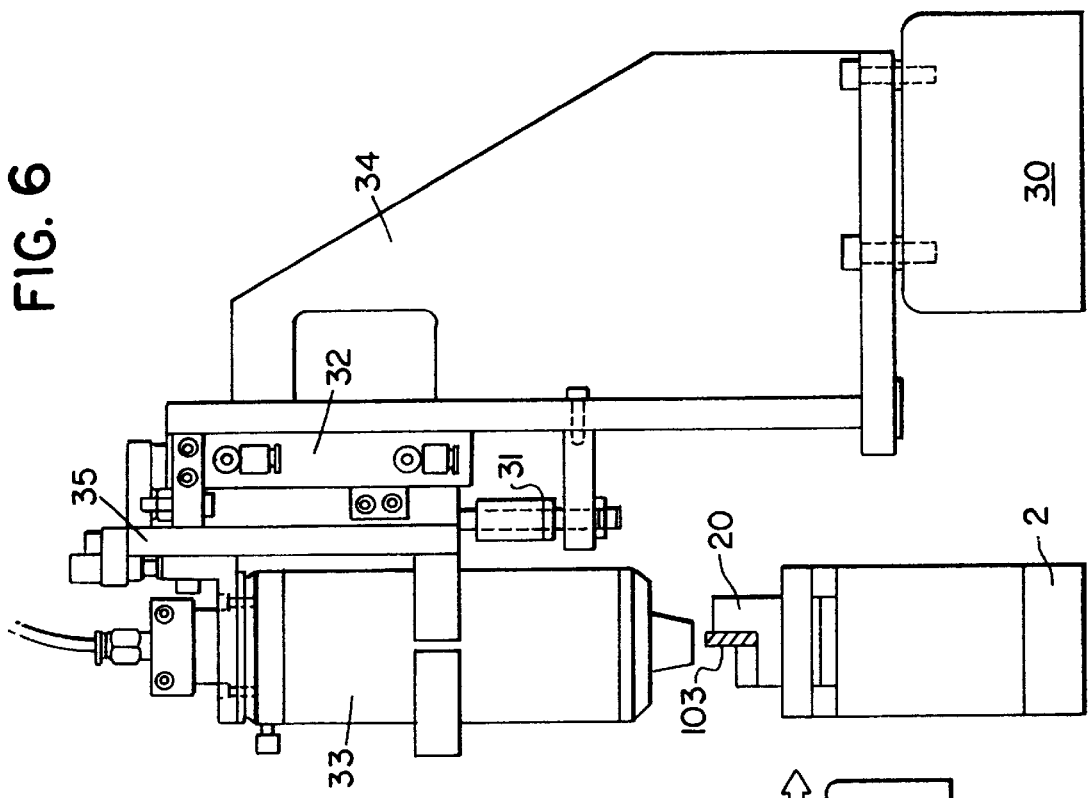
FIG. 6 is a side view of the application mechanism in FIG. 1.
Figure 5:
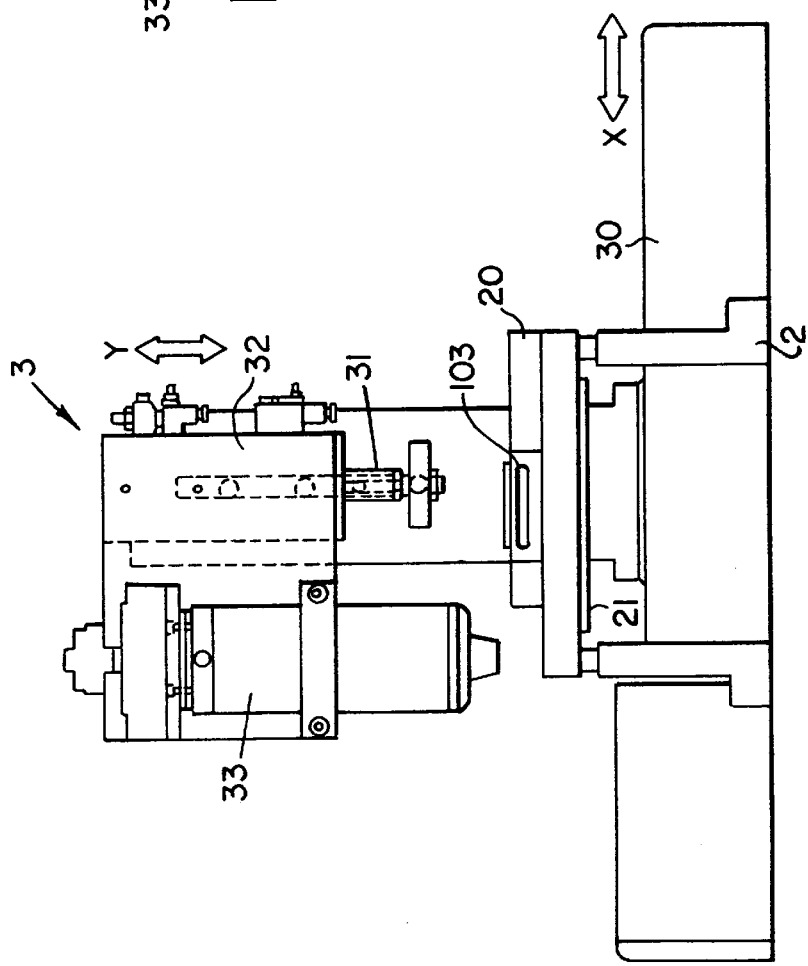
FIG. 5 is a front view of the application mechanism in FIG. 1.
Figure 7:
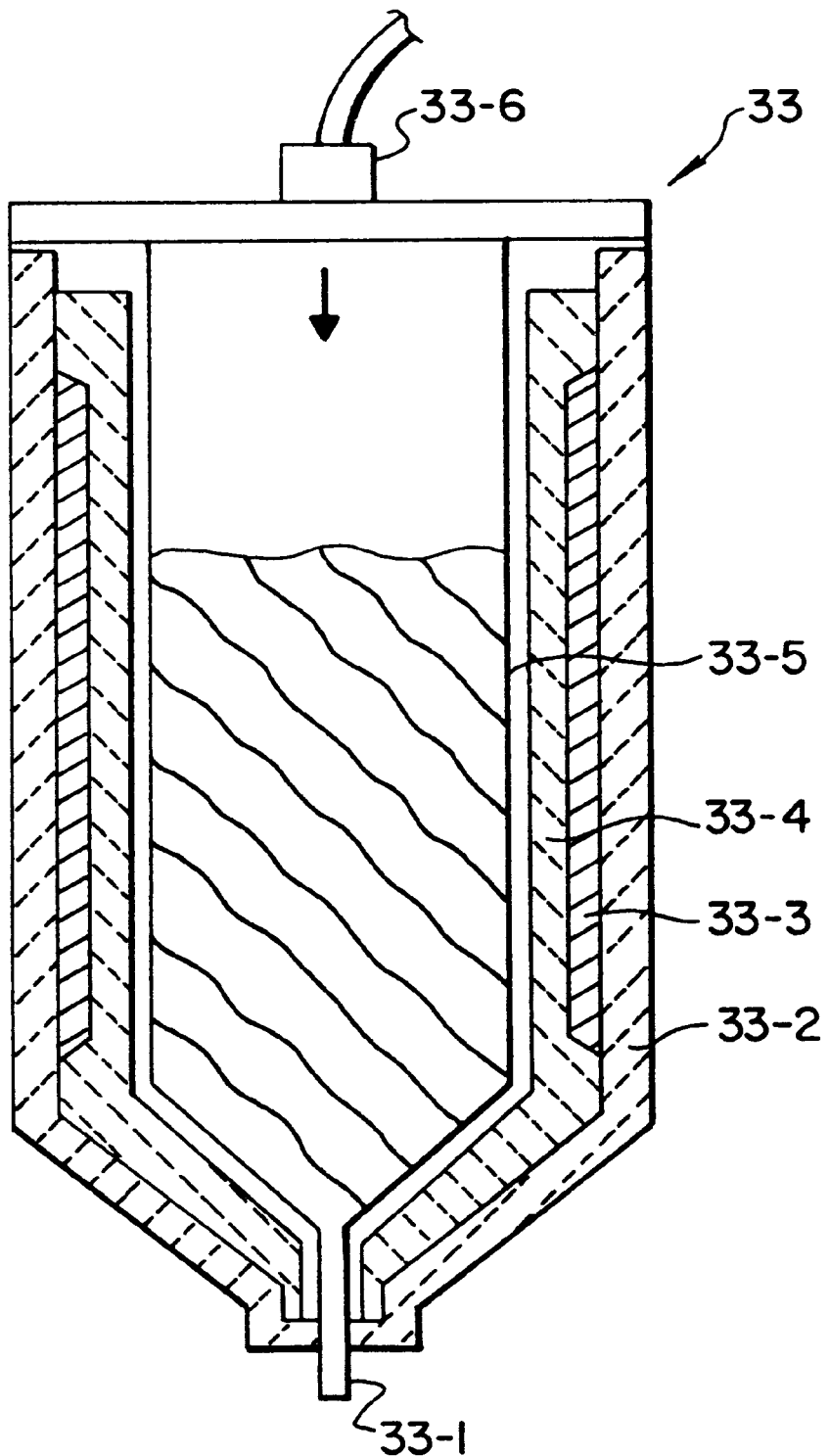
FIG. 7 shows the constitution of the dispenser in FIG. 5.

Next, each portion of the device for adhering row-bar is explained. FIG. 5 is a front view of the application mechanism in FIG. 1; FIG. 6 is a side view of the application mechanism in FIG. 1; and FIG. 7 shows the constitution of the dispenser in FIG. 5.

As shown in FIGS. 5 and 6, the dispenser 33 is supported by a supporting member 35. The supporting member 35 is moved in the direction of the arrow Y (up and down) in the figure with a pneumatic cylinder 32. The lower position of the supporting member 35 is regulated by a stopper 31. The pneumatic cylinder 32 is supported by a supporting member 34. An X axis robot 30 drives the supporting member 34 in the direction of the X arrow (side to side) in the figure.

The first setting mechanism 2 comprises an L-shaped block retaining portion to retain the block 103 and a heater 21 to heat the block 103 retained by the block holding portion 20.

Consequently, the dispenser 33 is driven upwards and downwards with the pneumatic cylinder 32 and driven sideways with the X axis robot 30.

As shown in FIG. 7, the dispenser 33 comprises an exterior tube 33-2 and an interior tube 33-4. The heater 33-3 is installed between the exterior tube 33-2 and the interior tube 33-4. A container 33-5 holds heat-melting wax. A nozzle 33-1 is installed on the end of the container 33-5. Air injected into the container 33-5 from an air inlet 33-6.

In this dispenser 30, the heat-melting wax in the container 33-5 is melted with the heater 33-3. Then, the wax in the container 33-5 is discharged from the nozzle 33-1 due to the injection of air from the air inlet 33-6.

Figure 8:
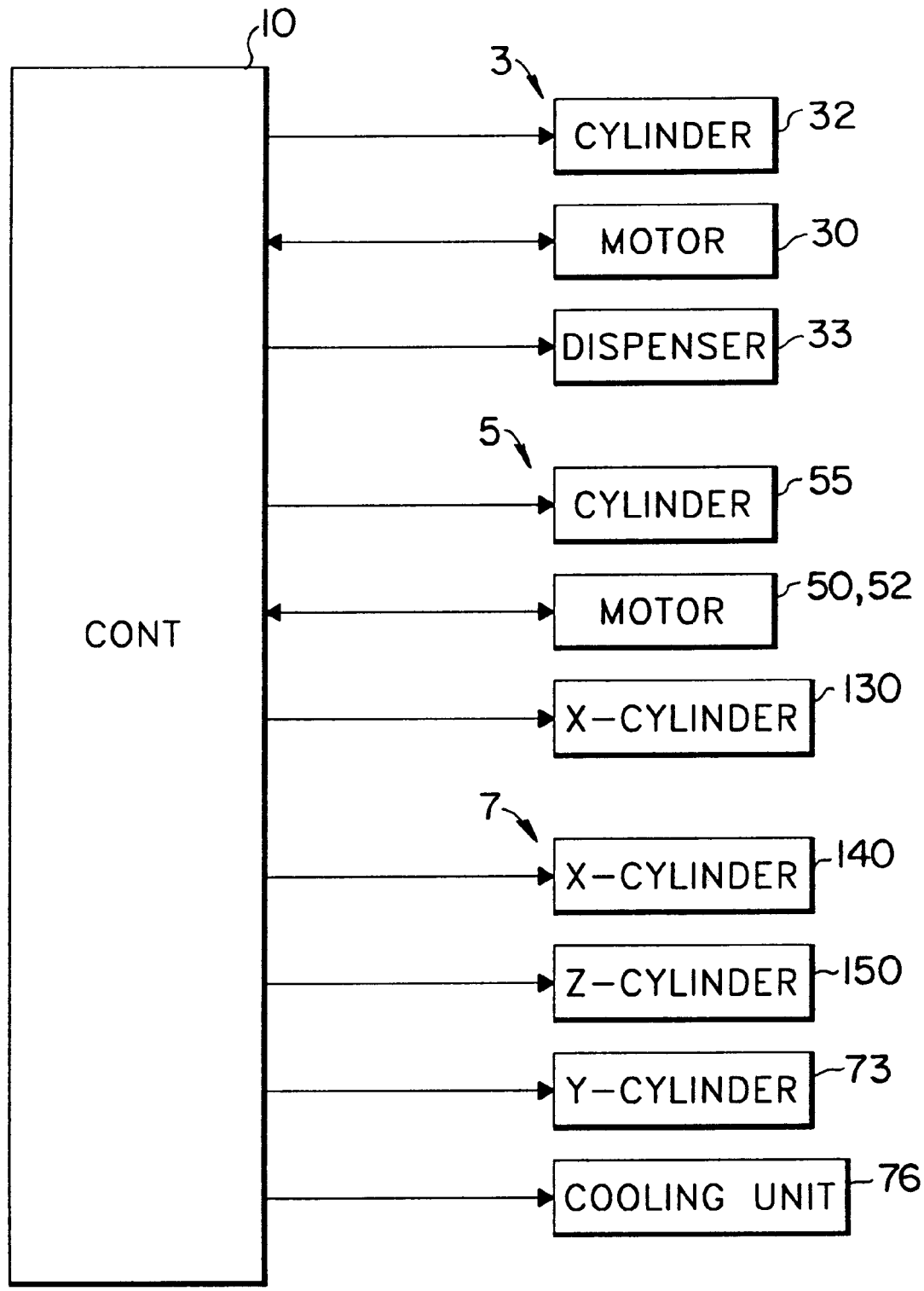
FIG. 8 is a block diagram of an embodiment of the present invention.

FIG. 8 is a block diagram of an embodiment of the present invention. The control circuit 10 is constituted with a sequencer circuit. The control circuit 10 provides sequential control of the dispenser 33, the X axis robot 30, and the pneumatic cylinder 32 of the application mechanism 3.

The control circuit 10 provides sequential control of the X cylinder 130 which pushes the block, the motor 50, and the pneumatic cylinder 55 of the linking mechanism 5, discussed below. The control circuit 10 provides sequential control for the forced air cooling mechanism 76, the Z axis cylinder 150, the Y axis cylinder 73, and the X axis cylinder 140 of the mechanism 7 for pressing and positioning, discussed below.

Figure 9:
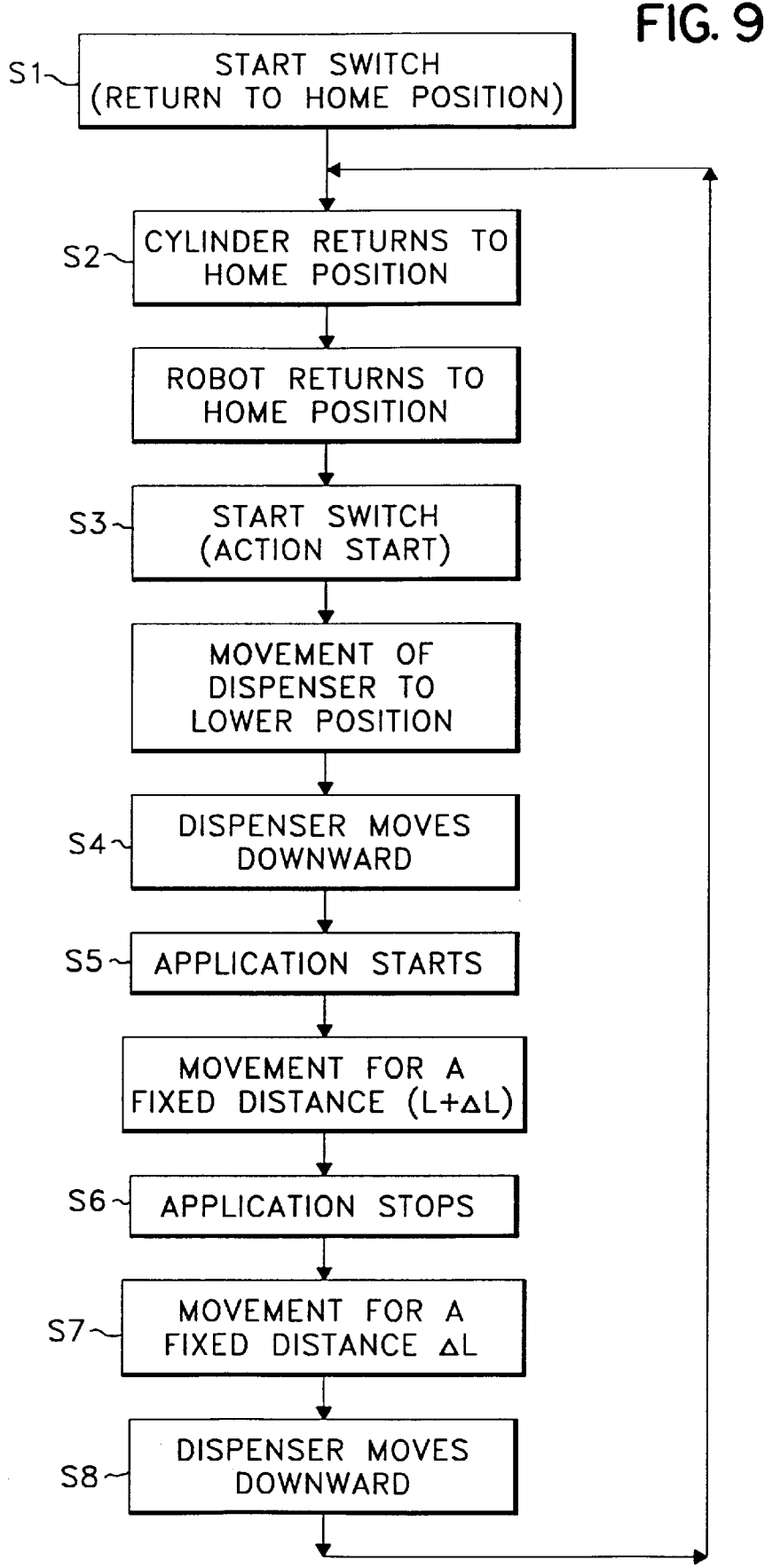
FIG. 9 is a flow diagram of action of the application mechanism in FIG. 5.
Figure 10:
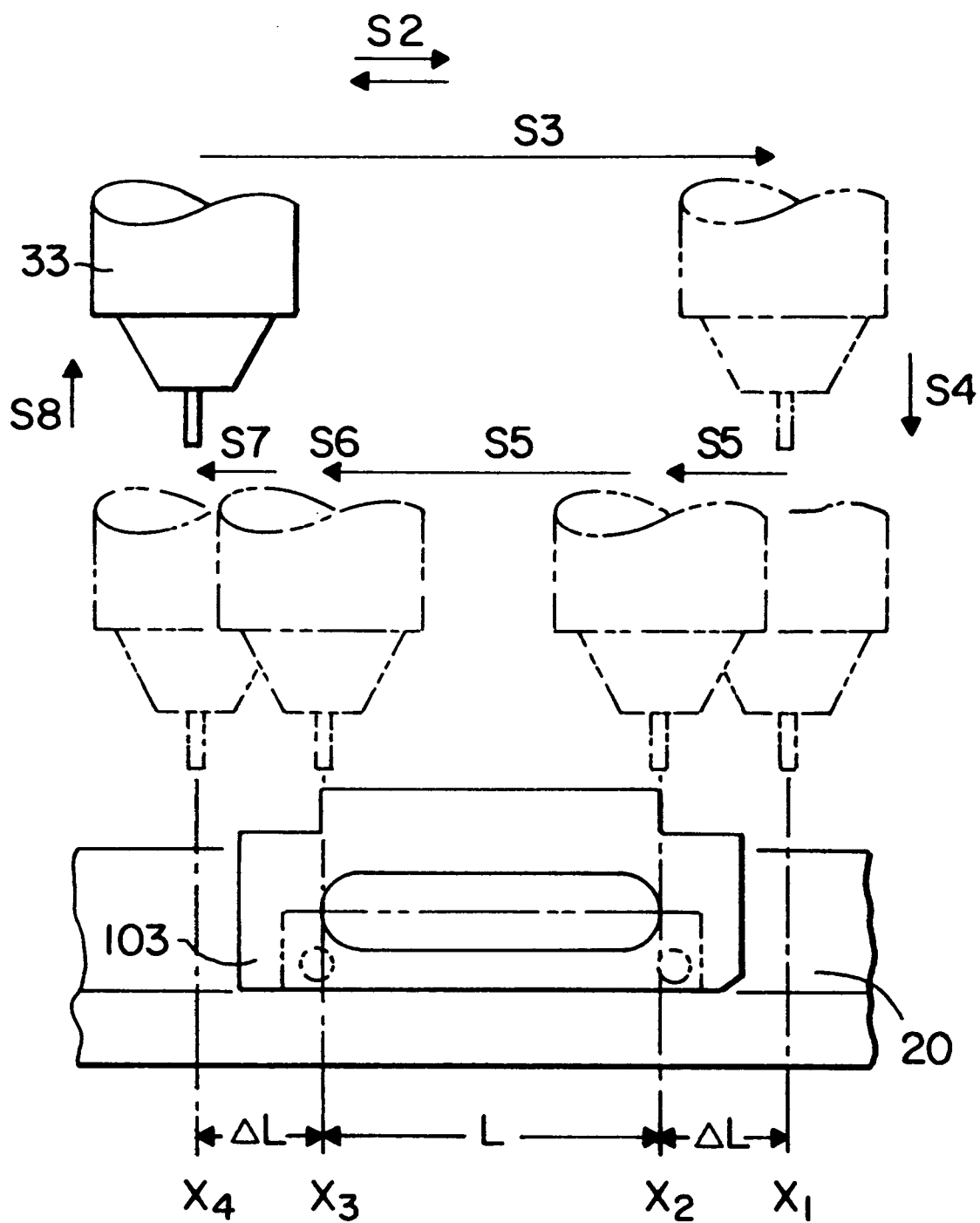
FIG. 10 is a diagram to explain the application action in FIG. 9.
Figure 11:
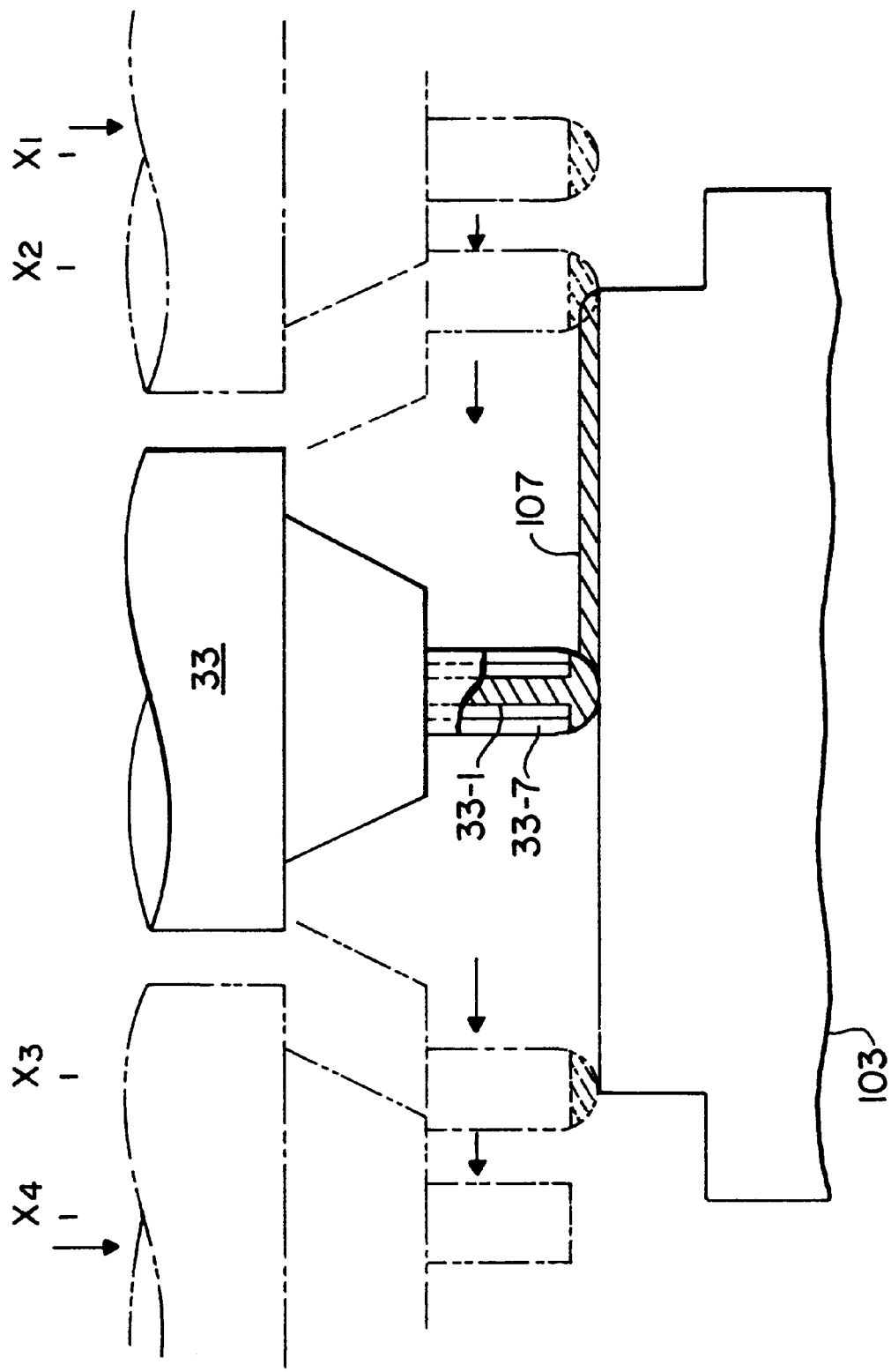
FIG. 11 is a diagram to explain the application state in FIG. 10.
Figure 12:
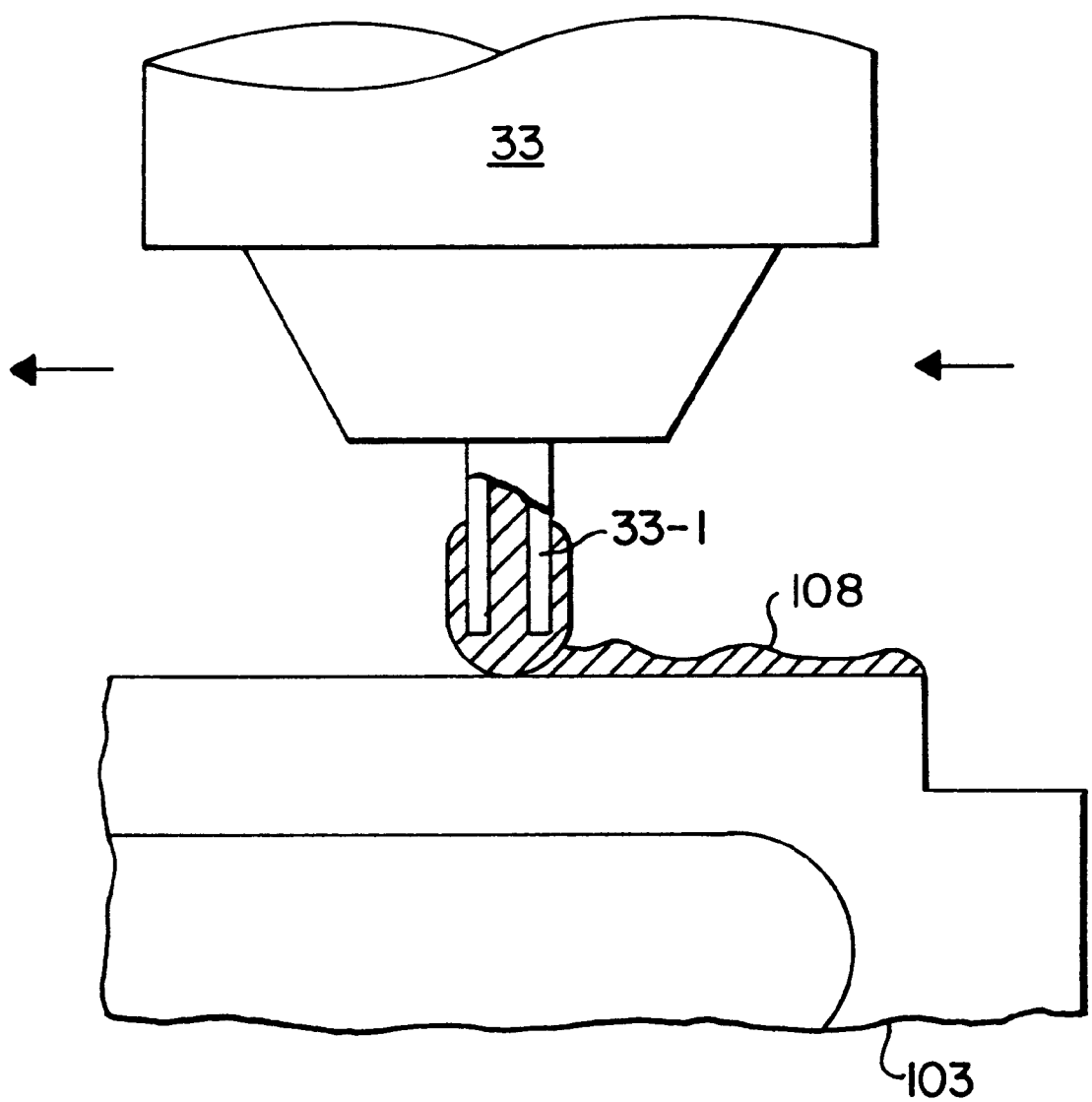
FIG. 12 is a diagram to explain a comparative example to explain FIG. 11.

FIG. 9 is a diagram of the flow of action of the application mechanism in FIG. 5; FIG. 10 is a diagram to explain the application action in FIG. 5; FIG. 11 is a diagram to explain the application state in FIG. 5; and FIG. 12 is a diagram to explain a comparative example.

The application action is explained with FIGS. 9, 10, 11.

(S1) The home position return action is started when a start switch, not pictured, is pushed.

(S2) The control circuit 10 causes the pneumatic cylinder 32 to return to the home position. Next, the control circuit 10 causes the X axis robot 30 to return to the home position.

(S3) The application action starts when a start switch, not pictured, is pushed. The control circuit 10 controls the X axis robot 30 and positions the dispenser 33 at the lower position X1. This lower position X1 is the position at a fixed distance $\Delta L$ from the application starting position X2 of the block 103.

(S4) The control circuit 10 controls the pneumatic cylinder 32 and lowers the dispenser 33.

(S5) The control circuit 10 controls the dispenser 33 and starts application. Specifically, air is sent into the container 33-5 of the dispenser 33 and the heat-melting wax is discharged from the nozzle 33-1. Meanwhile, the control circuit 10 controls the X axis robot 30 and causes the dispenser 33 to move toward the final application position of the block 103.

(S6) The control circuit 10 detects the arrival of the dispenser 33 at the final application position X3 of the block 103 with the position signal from the X axis robot 30. Then, the control circuit 10 controls the dispenser 33 and stops application. Specifically, the injection of air into the container 33-5 of the dispenser 33 is stopped. This stops the discharge of the heat-melting wax from the nozzle 33-1.

(S7) The control circuit 10 detects the arrival of the dispenser 33 at the upper position X4 with the position signal from the X axis robot 30, whereupon the control circuit 10 stops the movement of the X axis robot 30. This upper position X4 is a position at a fixed distance $\Delta L$ from the final application position X3 of the block 103.

(S8) The control circuit 10 controls the pneumatic cylinder 32 and causes the dispenser 33 to move upwards. Then, the process returns to Step 2.

In this way, movement is at a constant speed from the initial application position X2 to the final application position X3 of the block 103, because movement starts from the lower position X1 at a fixed distance from the initial application position X2 of the block 102 and movement stops at the upper position X4 at a fixed distance from the final application position X3 of the block 103.

For this reason, non-uniformity of the adhesive layer at the ends of the block 103 where application starts and finishes can be prevented. Consequently, an adhesive layer 107 with a uniform thickness can be formed as shown in FIG. 11. Here, the height of the nozzle 33-1 is preferably of a size where the end of the adhesive touches the block 103 with the surface tension of the adhesive from the nozzle 33-1.

Also, as shown in FIG. 11, a water repellent tube 33-7 (for example, a tube constituted of the brand name "Teflon" resin) is installed around the nozzle 33-1. As shown in the comparative example in FIG. 12, with the nozzle 33-1 alone, the heat-melting wax rises up around the exterior of the nozzle due to the effects of surface tension. Moreover, the heat-melting wax discharged hardens on the end of the nozzle due to temperature changes. For this reason, non-uniformity of the thickness of the adhesive layer 108 can occur as shown in FIG. 12.

On the other hand, as shown in FIG. 11, the installation of a water repellent tube 33-7 around the nozzle 33-1 reduces the effects of surface tension at the end of the nozzle. This can prevent the liquid rising up around the exterior of the nozzle. Also, this can prevent changes in viscosity due to temperature changes. Thereby, as shown in FIG. 11, non-uniformity of the thickness of the adhesive layer 107 can be prevented.

Furthermore, because the block 103 is heated with the heater 21, a stable action of applying adhesive, without the hardening the adhesive applied to the block 103, becomes possible.

Figure 13:
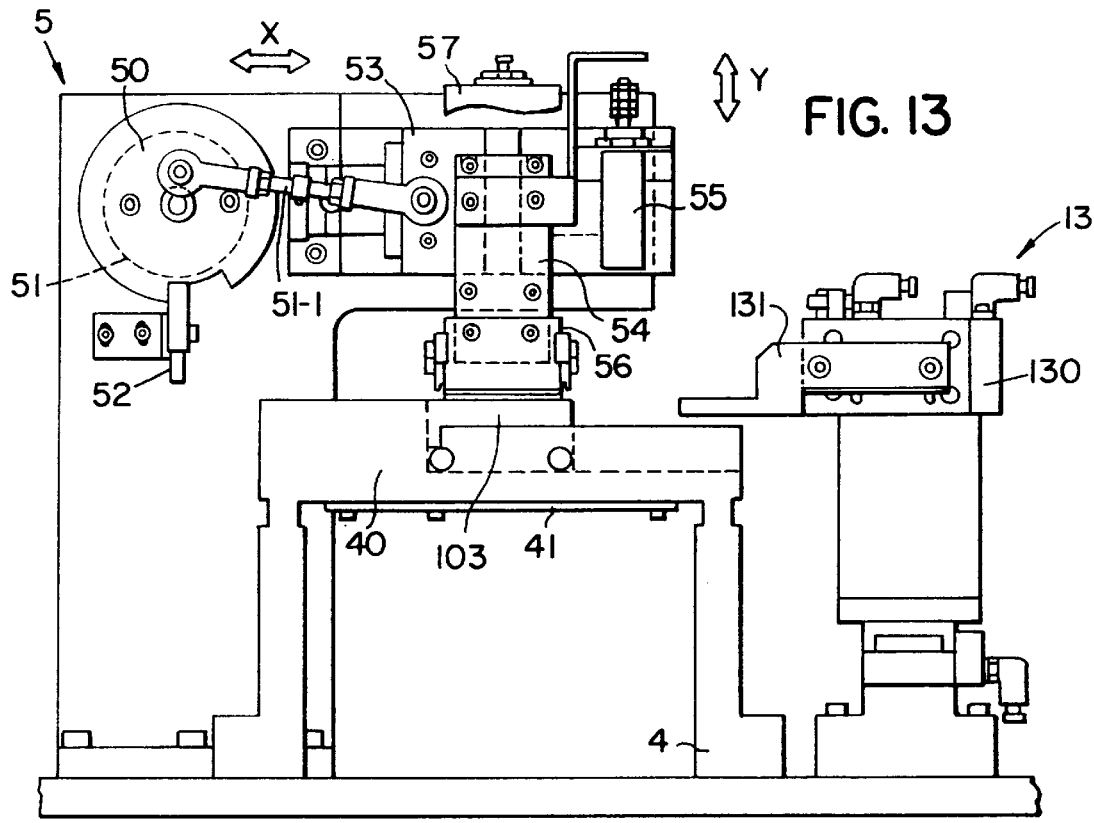
FIG. 13 is a front view of the linking mechanism in FIG. 1.
Figure 14:
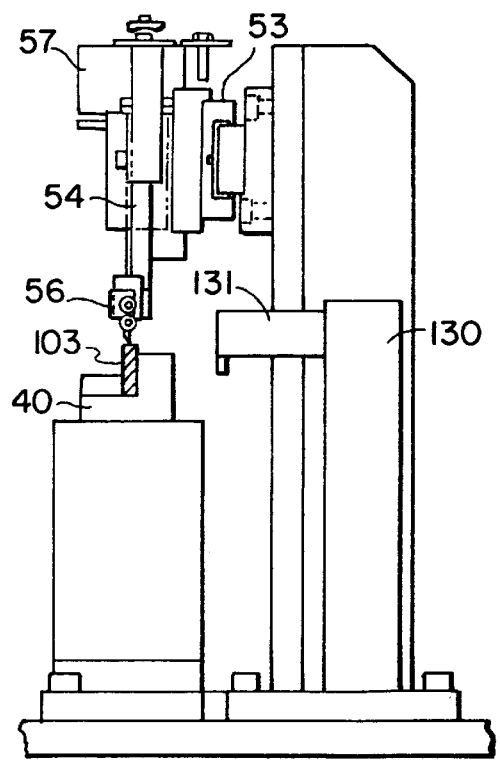
FIG. 14 is a side view of the linking mechanism in FIG. 1.

FIG. 13 is a front view of the linking mechanism in FIG. 1; FIG. 14 is a side view of the linking mechanism in FIG. 1; and FIG. 15 is a detail of the linking head in FIG. 13.

As shown in FIGS. 13 and 14, the linking head 56 is affixed on an arm 54. The arm 54 is moved in the direction of the Y arrow in the figure (up and down) with the pneumatic cylinder 55. The arm 54 and the pneumatic cylinder 55 are supported by a linear guide 53. A weight 56 is installed on the arm 54. A step motor 50 causes the encoder plate 51 to rotate. The encoder plate 51 is connected to the linear guide 53 with a connecting arm 51-1. A sensor 52 detects the position of the encoder plate 51. Consequently, the linking head 56 is driven in the direction of the X arrow (sideways) in the figure with the rotation of the step motor 50.

The pushing mechanism 13 comprises a pushing member 131 to push the block 103 set in the second setting mechanism 4 so that it does not move and a pneumatic cylinder 130 to drive this.

The second setting mechanism 4 comprises an L-shaped block retaining portion 40 to retain the block 103 and a heater 41 to heat the block 103 retained by the block retaining portion 40.

Consequently, the linking head 56 is driven upwards and downwards with the pneumatic cylinder 55 and is driven sideways with the step motor 50.

As shown in FIG. 15, an adhesion rubber 58 is installed on the end of the linking head 56. The adhesion rubber 58 prevents the sliding of the row-bar 101 on the block 103 during the linking action. Thereby, the linking head 56 moves the row-bar 101 sideways with respect to the block 103. Slippage prevention stops 59 are installed on both sides of the linking head 56. The slippage prevent stops 59 minimize the amount of runover of the row-bar 101 during the linking action.

Figure 16:
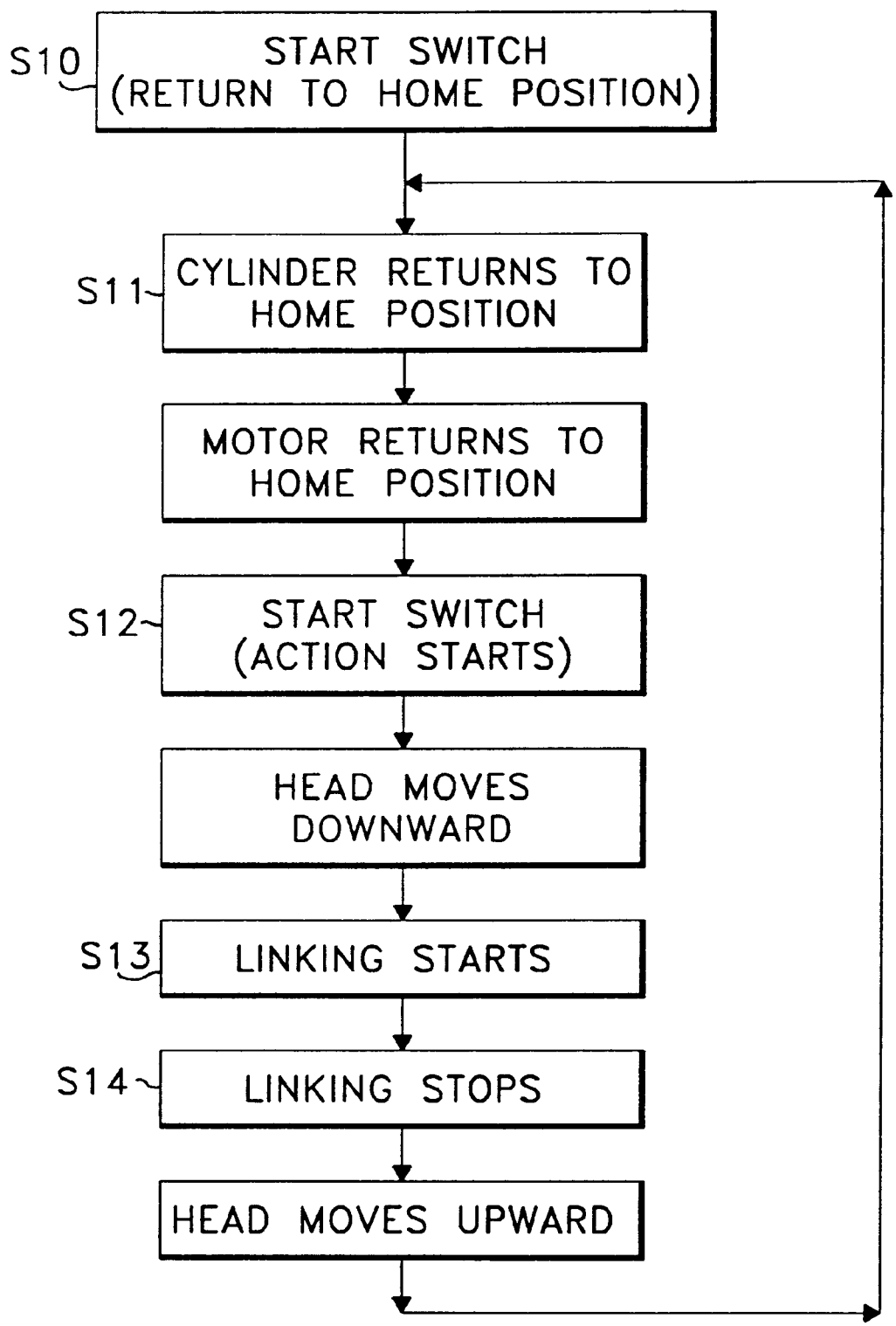
FIG. 16 is a diagram of the flow of action of the linking mechanism in FIG. 13.
Figure 18:
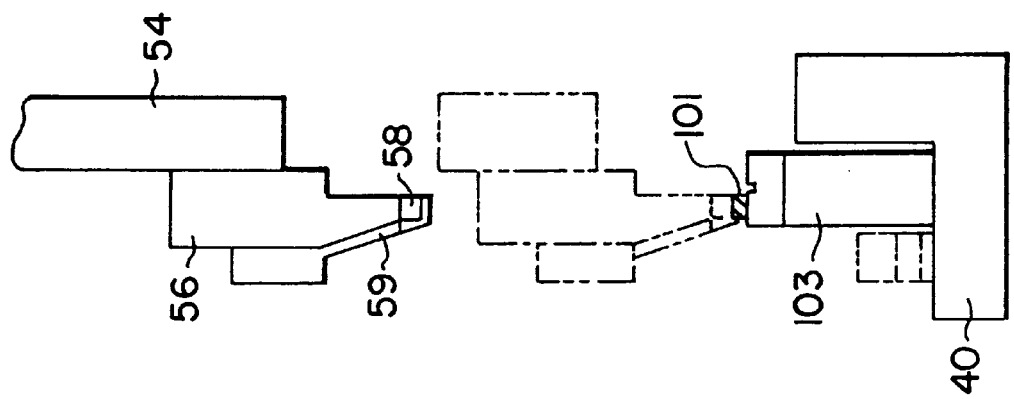
FIG. 18 is a diagram to explain the linking action in FIG. 13 (part 2)
Figure 17:
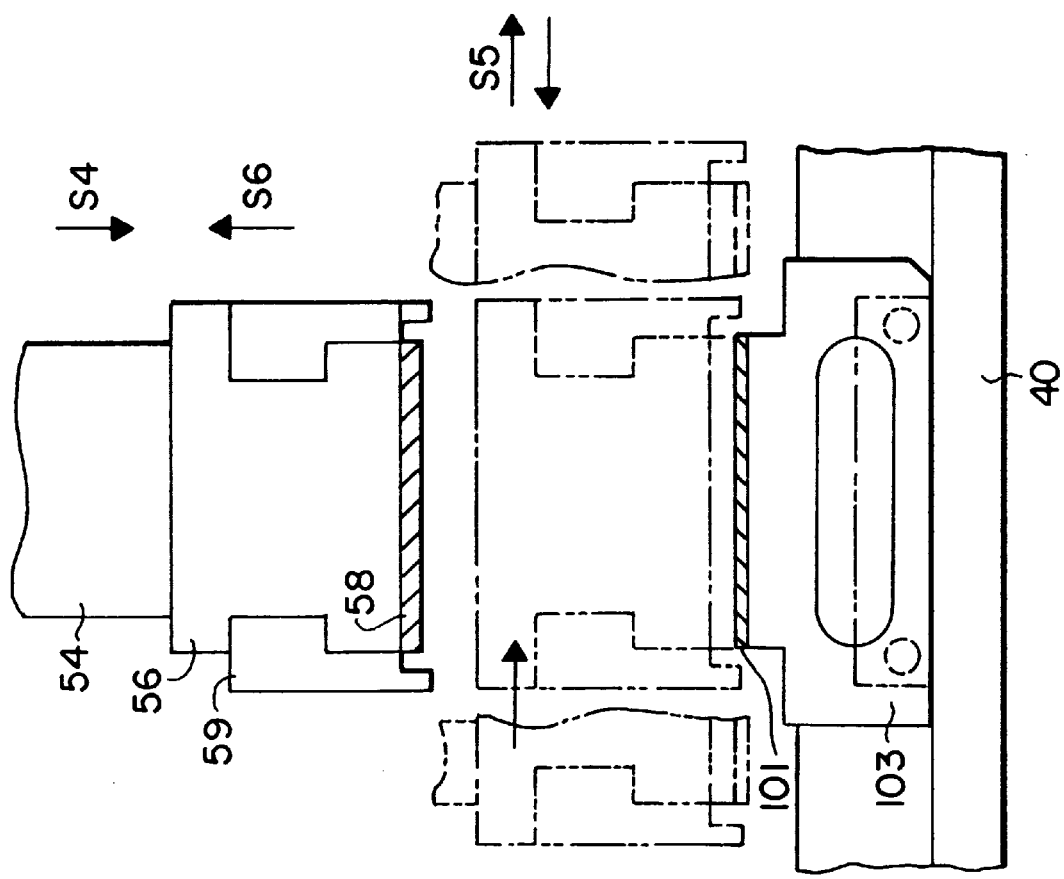
FIG. 17 is a diagram to explain the linking action in FIG. 13 (part 1)
Figure 19:
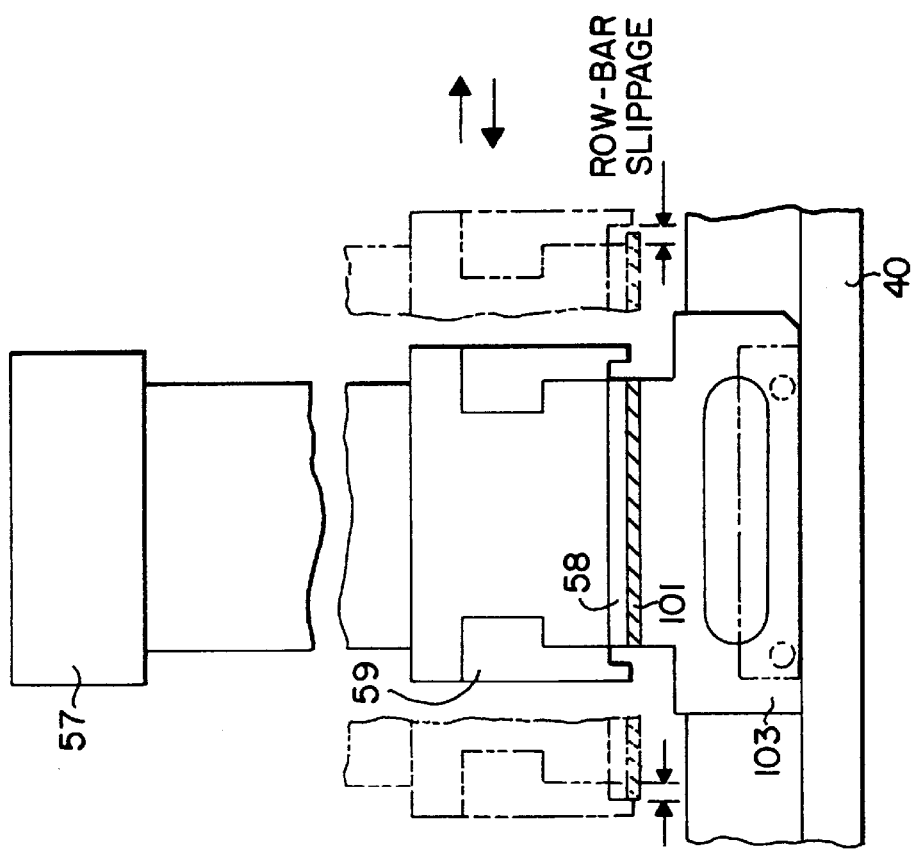
FIG. 19 is a diagram to explain the linking action in FIG. 13 (part 3)

FIG. 16 is a diagram of the flow of action of the linking mechanism in FIG. 13; FIG. 17 is a diagram to explain the linking action in FIG. 16 (part 1); FIG. 18 is a diagram to explain the linking action in FIG. 16 (part 2); and FIG. 19 is a diagram to explain the linking action in FIG. 16 (part 3).

The linking action is explained with reference to FIG. 16.

(S10) The home position return action starts when a start switch, not pictured, is pushed.

(S11) The control circuit 10 causes the pneumatic cylinder 55 to return to the home position. Next, the control circuit 10 causes the step motor 50 to return to the home position.

(S12) The linking action starts when a start switch, not pictured, is pushed. The control circuit 10 controls the pneumatic cylinder 55 and causes the linking head 56 to lower. Thereby, as shown in FIGS. 17 and 18, the adhesion rubber 58 of the linking head 56 adheres to the row-bar 101 on the block 103. The pressure at this time is determined by the weight 57.

(S13) The control circuit 10 controls the step motor 50 and starts the linking. Specifically, the control portion 10 causes the step motor 50 to rotate to move the linking head sideways. The block 103 is pushed by the pushing mechanism 13. For this reason, only the row-bar 101 is moved sideways with the movement of the linking head 56. This can prevent foreign matter in the adhesive layer between the row-bar 101 and the block 103 and can tightly adhere the row-bar 101 to the block 103. The linking frequency is determined by the number of revolutions of the step motor 50.

(S14) The control circuit 10 detects the step motor 50 having reached a prescribed number of revolutions. Then, the control circuit 10 stops the rotation of the step motor 50 and stops the linking action. Next, the control circuit 10 controls the pneumatic cylinder 55 and raises the linking head 54. Then, the process returns to Step S11.

During this linking action, the row-bar 101 slides on the adhesion rubber 58 of the linking head 56 due to the runover adhesive, etc. However, as shown in FIG. 19, the slippage of the row-bar 101 can be minimized since the slippage prevention stops 59 control the sideways slippage of the row-bar 101.

In this way, foreign matter in the adhesive layer between the row-bar 101 and the block 103 can be prevented with the linking action and the row-bar 101 tightly adhered to the block 103. Also, the linking frequency becomes constant because the linking action is performed automatically. Consequently, the linking action becomes constant and the adhesion work is stabilized.

Furthermore, the hardening of the adhesive during the linking action can be prevented because the block 103 is heated with the heater 41.

Figure 20:
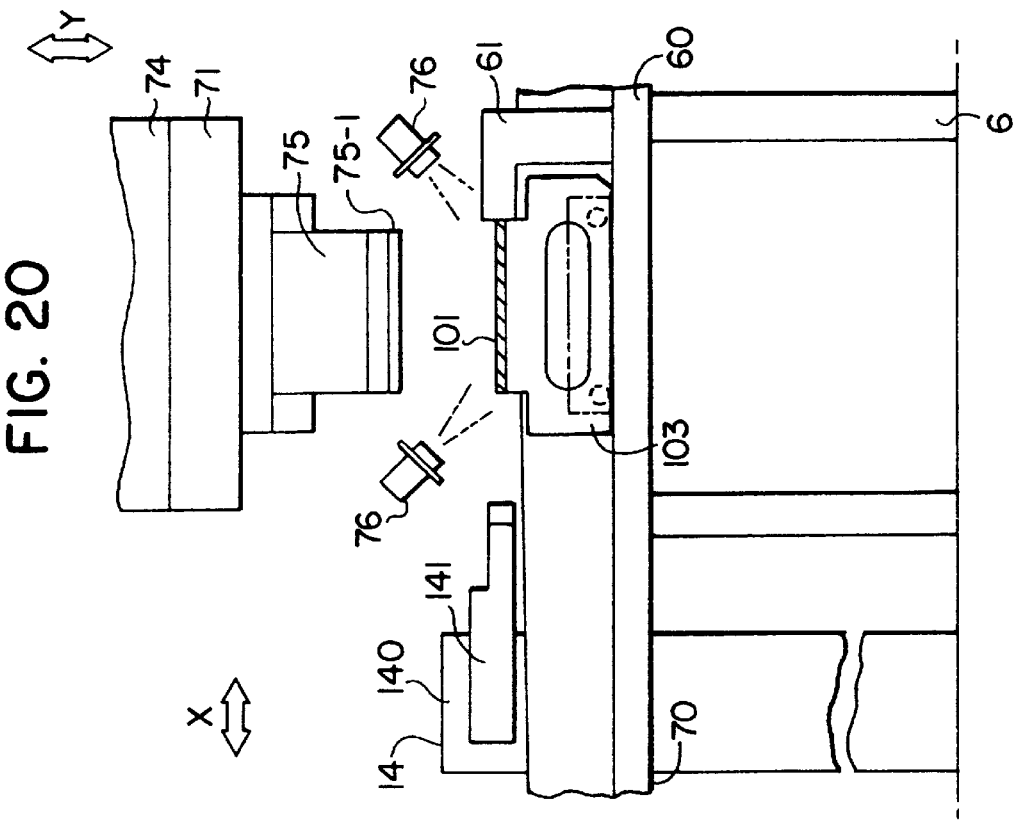
FIG. 20 is a front view of the mechanism for pressing and positioning in FIG. 1.
Figure 21:
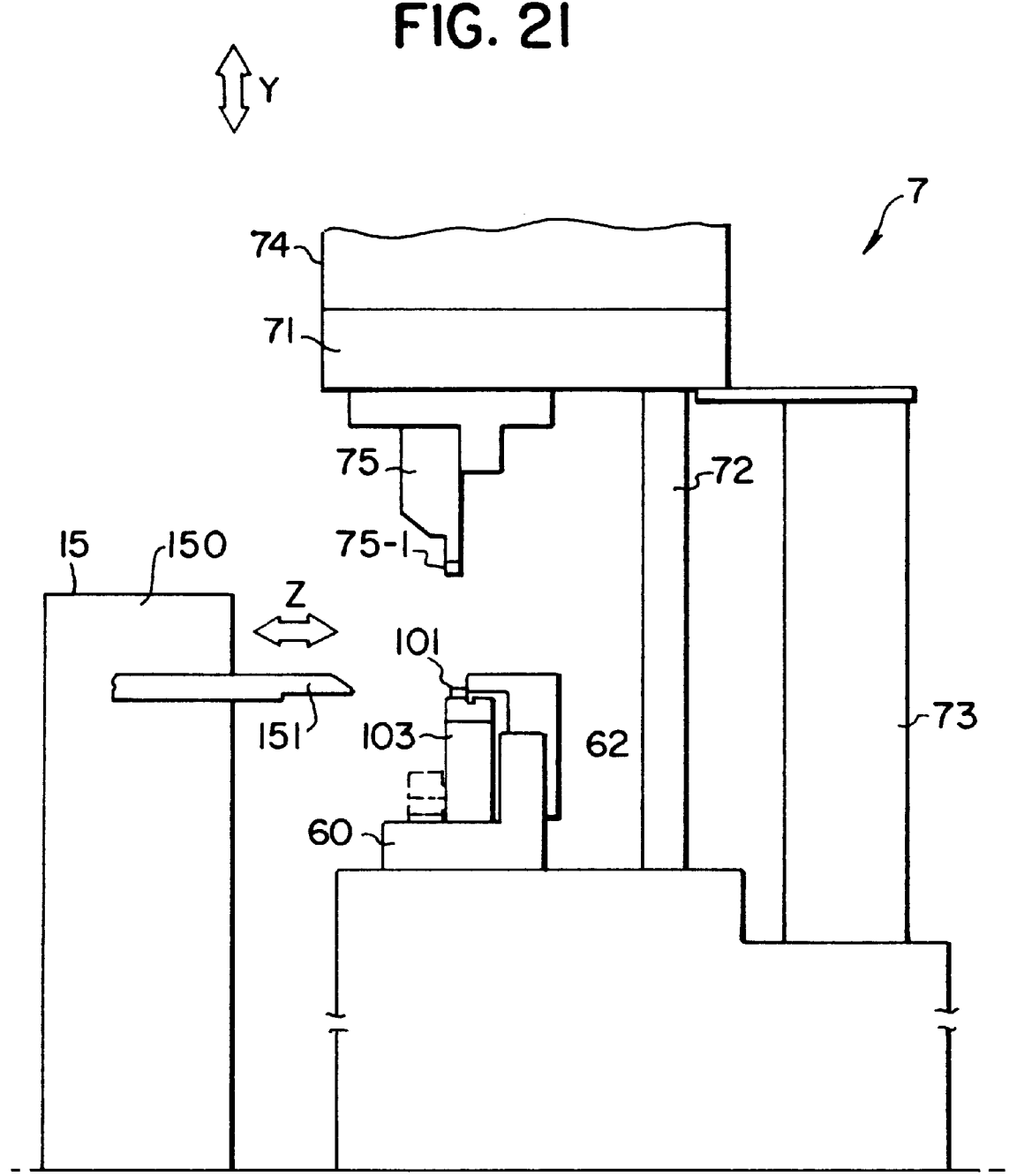
FIG. 21 is a side view of the mechanism for pressing and positioning in FIG. 1.

FIG. 20 is a front view of the mechanism for pressing and positioning in FIG. 1; FIG. 21 is a side view of the mechanism for pressing and positioning in FIG. 1.

As shown in FIGS. 20 and 21, the pressing head 75 is fixed on the arm 71. The arm 72 is moved along the guide 72 in the direction of the Y arrow (up and down) in the figure with the pneumatic cylinder 73. An adhesion rubber 75-1 is installed on the end of the pressing head 75. A weight 74 is installed on the arm 71. A cooling mechanism 76 blows air on the block 103 and effects forced air cooling.

The following are installed on the third setting mechanism 6: an L-shaped block retaining portion 60 to retain the block 103, a pushing member 61 to push the block 103 and the row-bar 101 in the direction of the X axis, and a pushing member 62 to push the row-bar 101 in the direction of the Z axis.

The X axis positioning mechanism 14 comprises a positioning member 141 to position the row-bar 101 and block 103 set in the third setting mechanism 6 in the direction of the X axis and a pneumatic cylinder 140 to drive this positioning member 141. The Z axis positioning mechanism 15 comprises a positioning member 151 to position the row-bar 101 set in the third setting mechanism 6 in the direction of the Z axis and a pneumatic cylinder 150 to drive this positioning member 151.

Consequently, the block 103 and the row-bar 101 are positioned in the direction of the X axis with the X axis positioning mechanism 14. The row-bar 101 is positioned in the direction of the Z axis with respect to the block 103. Thereby, the pressing head 75 is moved up and down in the Y direction with the pneumatic cylinder 73.

Figure 22:
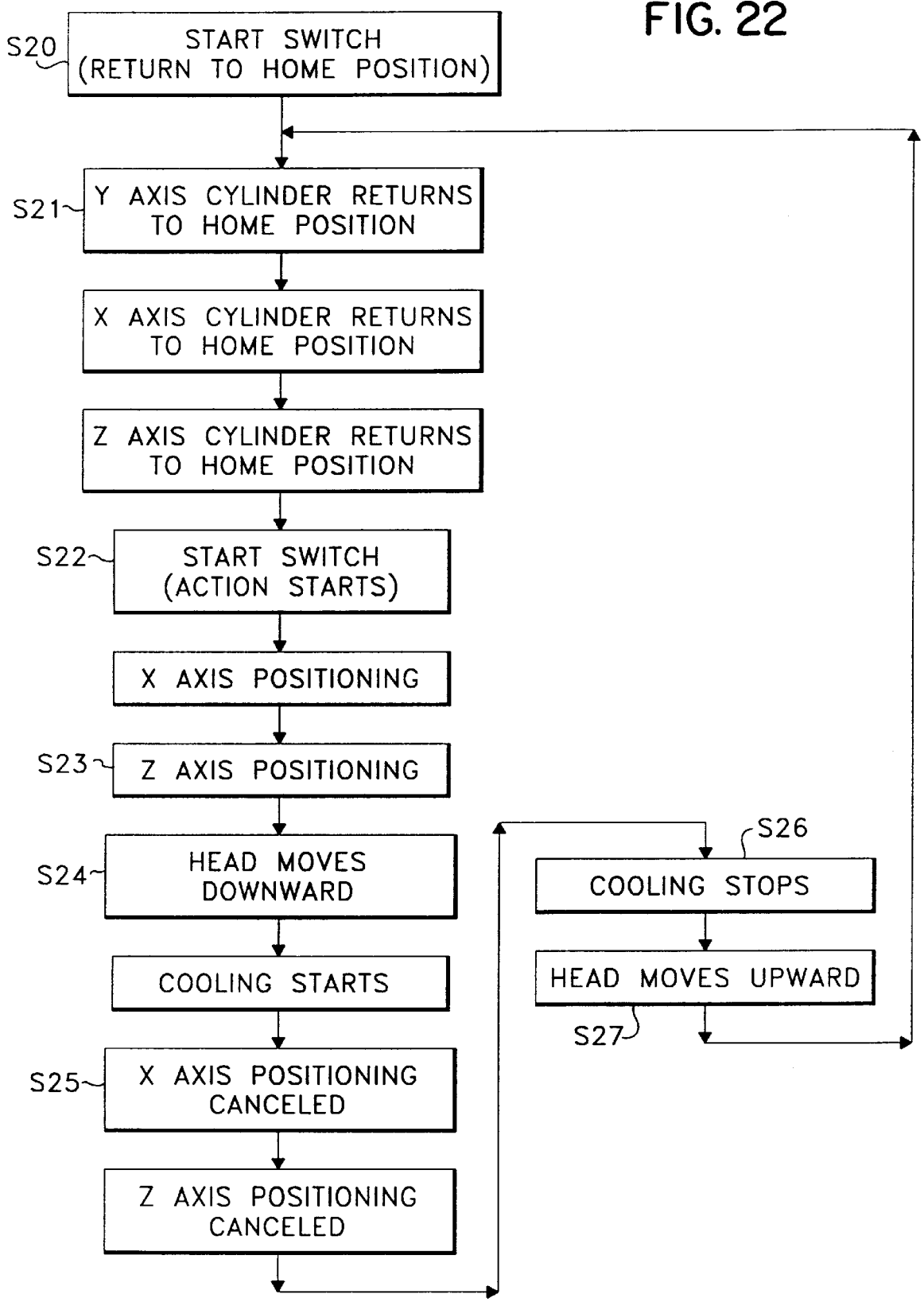
FIG. 22 is a diagram of the flow of action of the mechanism for pressing and positioning in FIG. 20.
Figure 24:
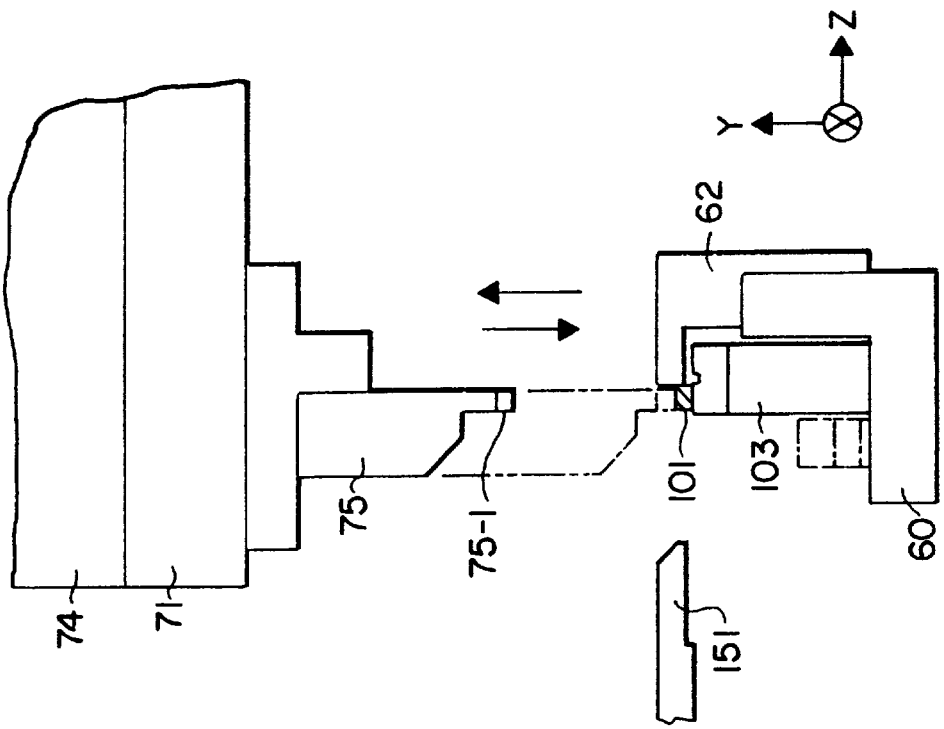
FIG. 24 is a diagram to explain the pressing and positioning action in FIG. 20.
Figure 23:
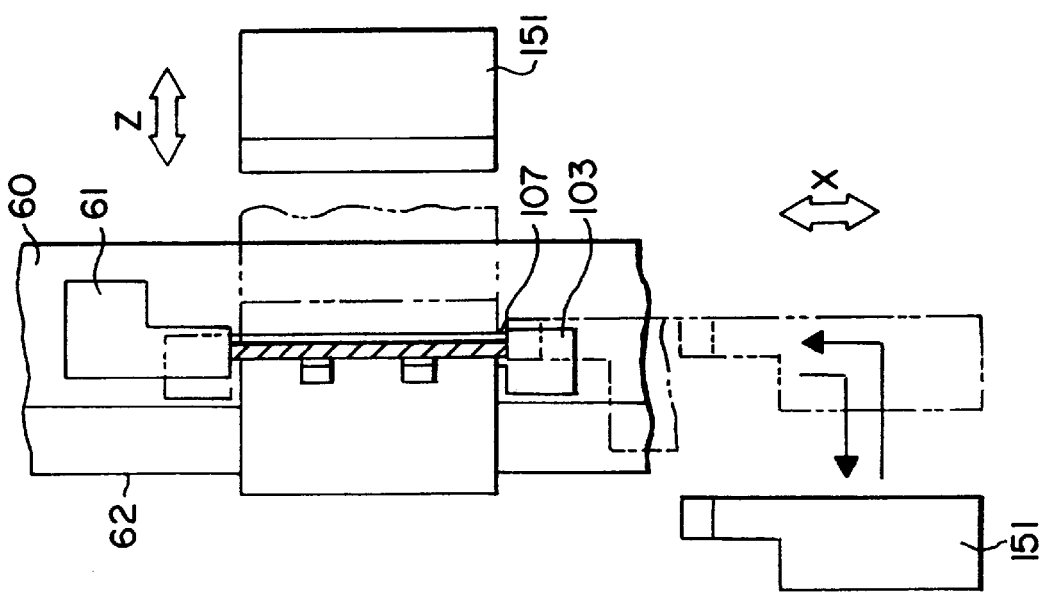
FIG. 23 is a diagram to explain the pressing and positioning action in FIG. 20.
Figure 25A:
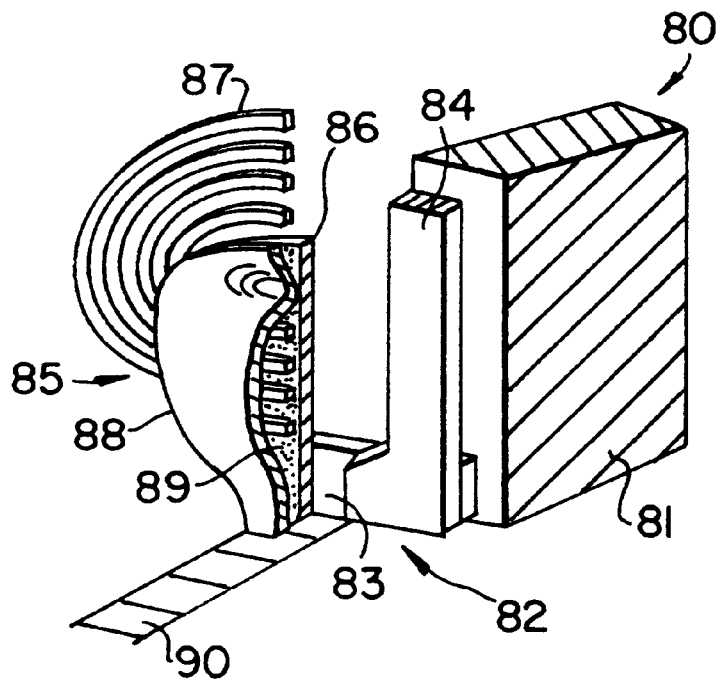
FIGS. 25A and 25B are diagrams to explain composite magnetic heads.
Figure 25B:
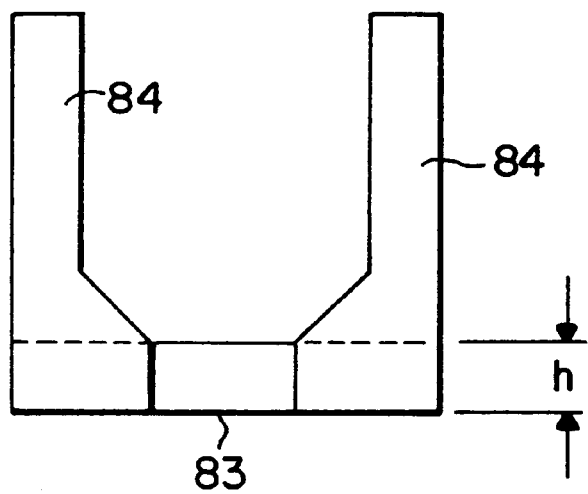
Figure 26A:
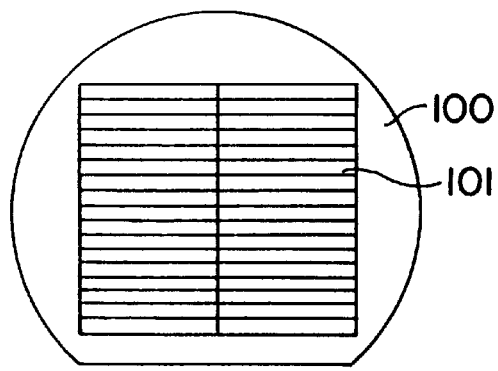
FIGS. 26A, 26B and 26C are diagrams to explain the manufacturing process for composite magnetic heads (part 1)
Figure 26B:
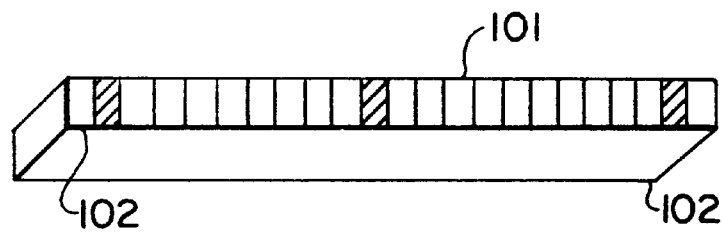
Figure 26C:
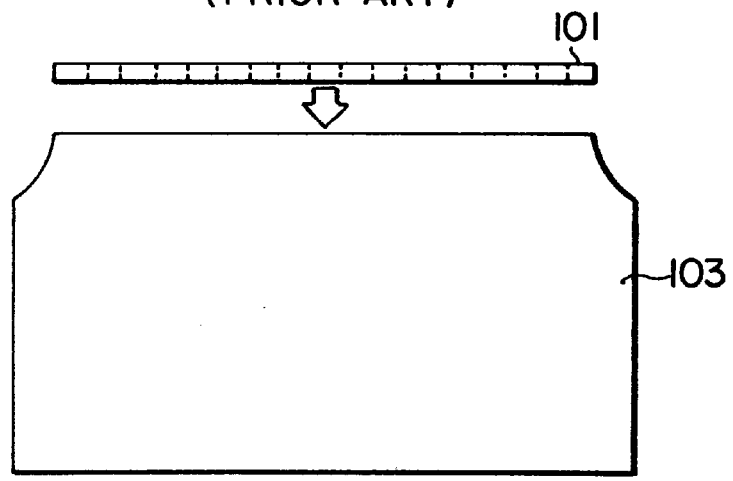
Figure 27A:
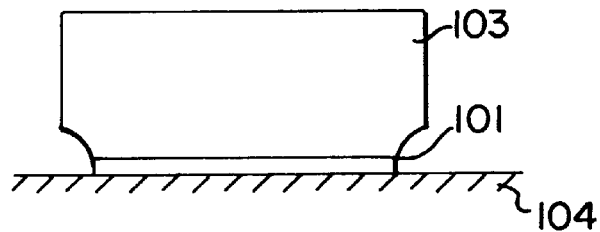
FIGS. 27A, 27B, 27C and 27D are diagrams to explain the manufacturing process for composite magnetic heads (part 2)
Figure 27B:
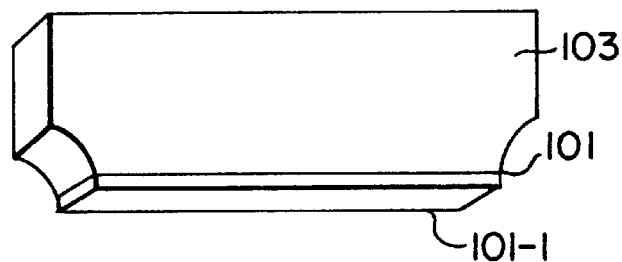
Figure 27C:
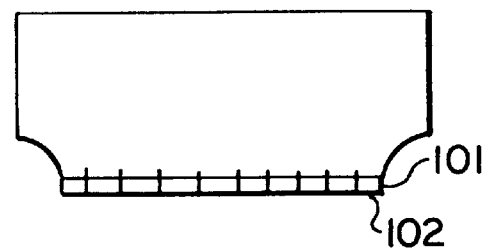
Figure 27D:
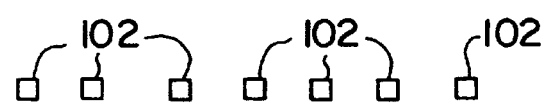
Figure 28A:
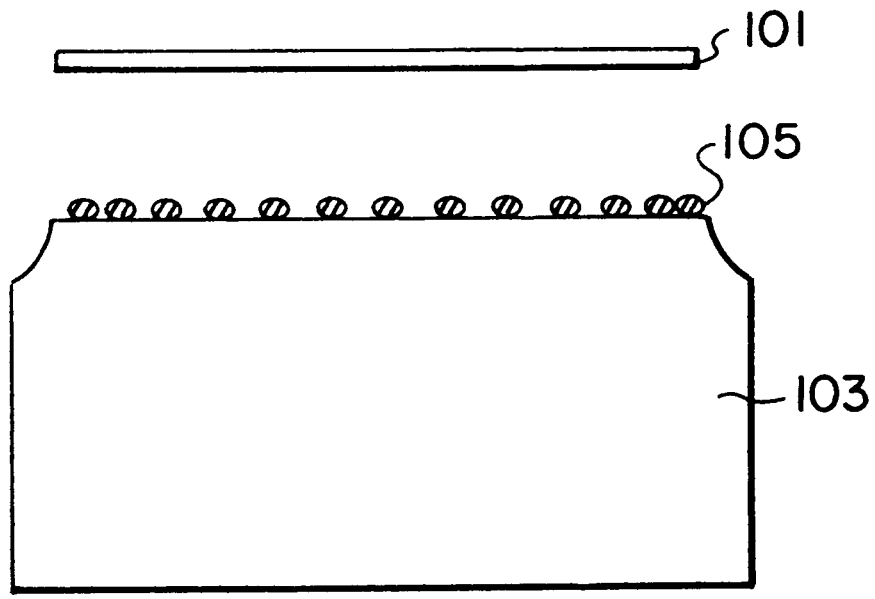
FIGS. 28A and 28B are diagrams to explain the prior art.
Figure 28B:
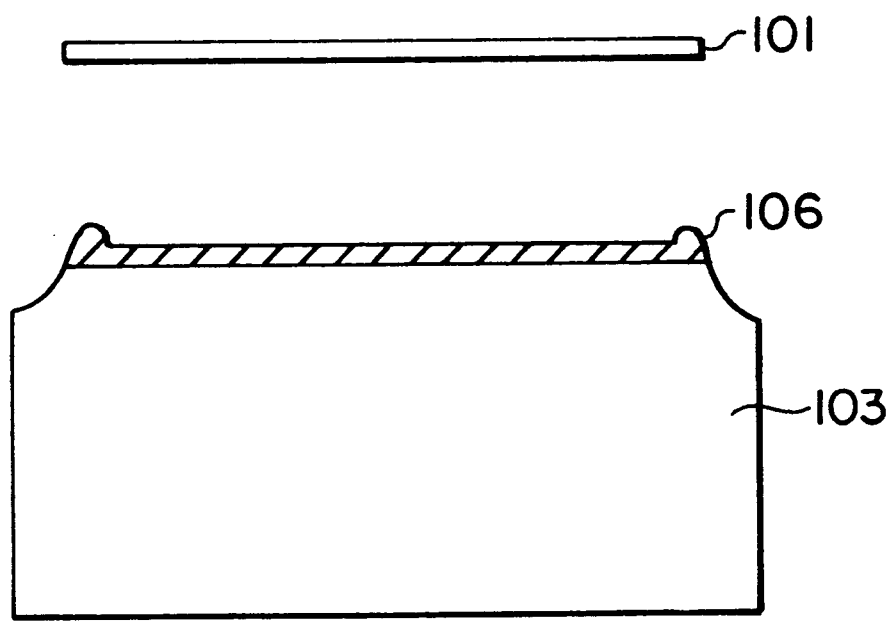

FIG. 22 is a diagram of the flow of action of the mechanism for pressing and positioning in FIG. 13; FIG. 23 is a diagram to explain the positioning action in FIG. 20; and FIG. 24 is a diagram to explain the pressing action in FIG. 20.

The pressing and position action is explained with reference to FIG. 22.

(S20) The home position return action is started when a start switch, not pictured, is pushed.

(S21) The control circuit 10 causes the Y axis pneumatic cylinder 73 to return to the home position. Next, the control circuit 10 causes the X axis pneumatic cylinder 140 to return to the home position. Furthermore, the control circuit 10 causes the X axis pneumatic cylinder 150 to return to the home position.

(S22) The positioning action starts when a start switch, not pictured, is pushed. The control circuit 10 controls the pneumatic cylinder 140 to drive the X axis positioning member 141. With this, as shown in FIG. 23, the X axis positioning member 141 pushes the block 103 and the row-bar 101 to the X axis pushing member 61, thereby effecting positioning in the direction of the X axis.

(S23) The control circuit 10 controls the pneumatic cylinder 150 to drive the Z axis positioning member 151. With this, as shown in FIG. 23, the Z axis positioning member pushes the row-bar 101 to the Z axis pushing member 62, thereby effecting positioning in the direction of the Z axis of the row-bar 101 with respect to the block 103.

(S24) The control circuit 10 controls the pneumatic cylinder 73 and lowers the pressing head. With this, as shown in FIG. 24, the pressing head 75 pushes the row-bar 101 against the block 103. The pressing force at this time is determined by the weight 74.

Then, the control circuit 10 drives the cooling mechanism 76 and effects forced air cooling of the block 103 and the row-bar 101. With this, the adhesive is cooled and hardening of the adhesive becomes certain.

(S25) The control circuit 10 controls the pneumatic cylinder 140 when a prescribed period of time passes and cancels the positioning of the X axis positioning member 141. With this, as shown in FIG. 23, the X axis positioning member 141 returns. Furthermore, the control circuit 10 controls the pneumatic cylinder 150 and cancels the positioning of the Z axis positioning member 151. With this, as shown in FIG. 23, the Z axis positioning member 151 returns.

(S26) The control circuit 10 stops the cooling by the cooling mechanism 76. Then, the control circuit 10 controls the pneumatic cylinder 73 to raise the pressing head 75. Then, the process returns to Step S21.

In this way, the row-bar 101 is adhered to the block 103 after the row-bar 101 is positioned with respect to the block 103 by the pressing and positioning action. Also, since there is cooling, the hardening of the adhesive can be certain. Furthermore, the precision of positioning becomes constant since the pressing and positioning action is performed automatically.

The present invention can have the following types of variations in addition to the embodiment discussed above.

(1) The embodiment discussed above was explained for an example where a row-bar constituting a row of magnetic heads as the adhered member, but the present invention can also be applied to the adhesion of other thin members.

(2) The embodiment discussed above was explained for the use of heat-melting wax as the adhesive, but the present invention can be applied to other adhesives.

The present invention was explained with an embodiment, but various variations within the essential scope of the present invention are possible and these are not excluded from the scope of the present invention.

As explained above, the present invention has the following merits.

(1) Because the action of discharging adhesive and the movement are started from the first position at a fixed distance from the starting end of the base, movement has a constant speed at the starting end of the base. For this reason, the present invention can prevent non-uniformity of the adhesive layer at the starting end of the base. Also, since the movement is stopped at a second position at a fixed distance from the finishing end of the base after stopping the action of discharging adhesive at the ending position of the base, the movement has a constant speed at the finishing end of the base. For this reason, the present invention can prevent irregularities in the adhesive layer at the finishing end of the base.

For this reason, the present invention can make the thickness of the adhesive layer uniform. Thereby, the present invention can prevent non-uniformity of the adhesion strength of the member and warping of the member, even in the case of adhering a thin member.

(2) Since the member is moved in a reciprocating motion while pressing the member to the base with the linking mechanism after adhering the member to the base, the member can prevent foreign matter, such as air bubbles, in the adhesive layer and can more closely adhere the member to the base. Consequently, the present invention can prevent non-uniformity of the adhesion strength of the member and warping of the member. Moreover, since the member positions while pressing with the pressing mechanism, the present invention can improve the precision of positioning the member with respect to the base. Furthermore, the present invention can automate the adhesion process and can ensure the safety of the operator.

What is claimed is:

1. A method for adhering a member to a base by means of an adhesive after applying said adhesive on the base, using moving adhesive application means, comprising:

a step of positioning said adhesive application means at a first position before an application start position of said base;

a step of starting movement of said adhesive application means from said first position while starting the action of discharging adhesive of said adhesive application means;

a step of completing the action of discharging adhesive of said adhesive application means at an application end position of said base; and a step of stopping the movement of said adhesive application means at a second position after the application end position of said base.

2. The method for adhering a member according to claim 1, further including:

a step of attaching said member on said adhesive of said base: and a step of moving said member in a reciprocating motion with respect to said base with a linking mechanism on said adhesive of said base.

3. The method for adhering a member according to claim 1, further comprising:

a step of attaching said member on said adhesive of said base; and a step of pressing said member to said base after said member is positioned with respect to said base with a pressing mechanism.

4. The method for adhering a member according to claim 3, wherein the step of pressing is a step to press said member to said base while cooling said adhesive.

5. A method for adhering a member to a base by means of an adhesive, comprising:

a step of applying said adhesive to said base with adhesive application means;

a step of attaching said member on said adhesive of said base;

a step of moving said member in a reciprocating motion with respect to said base while pressing said member to said base with a linking mechanism; and a step of positioning said member to said base while pressing said member to said base with a pressing mechanism.

6. An apparatus for adhering a member to a base by means of an adhesive after applying said adhesive on the base, comprising:

first means for applying said adhesive to said base;

second means for moving said first means; and control means for controlling said second means so as to move said first means from a first position before an application start position of the base, via said application start position, toward a second position after an application end position of the base in order to move with a constant speed between the application start position and the application end position.

7. The apparatus for adhering a member according to claim 6, wherein said first means includes a discharge nozzle for discharging said adhesive and a water repellent member installed to the periphery of said discharge nozzle.

8. The apparatus for adhering a member according to claim 6, further comprising a linking mechanism for moving said member in a reciprocating motion with respect to said base after installing said member on said adhesive of said base.

9. The apparatus for adhering a member according to claim 8, further including a pressing mechanism for pressing said member to said base after positioning said member with respect to said base.

10. The apparatus for adhering a member according to claim 9, wherein said pressing mechanism includes cooling means for cooling said adhesive.

11. An apparatus for adhering a member to a base by means of an adhesive after applying said adhesive to the base, comprising:

applying means for applying said adhesive to said base;

linking means for moving said member in a reciprocating motion with respect to said base while pressing said member to said base; and pressing means for pressing said member to said base.

12. The apparatus for adhering a member according to claim 11, wherein said applying means and said linking means include heating means for heating said base.

13. The method for adhering a member according to claim 1, further including:

a step of attaching said member on said adhesive of said base.

14. The method for adhering a member according to claim 13, wherein said attaching step comprises a step of attaching a thin film member on said adhesive of said base.

15. The method for adhering a member according to claim 2, further comprising a step of pressing said member to said base after said member is positioned with respect to said base with a pressing mechanism.

16. The method for adhering a member according to claim 2, wherein said moving step comprises a step of moving a thin film member in a reciprocating motion with respect to a work base.

17. The method for adhering a member according to claim 5, wherein said attaching step comprises a step of attaching a thin film member on said adhesive on a work base.

18. The method for adhering a member according to claim 17, wherein said applying step comprises a step of applying a heat melting wax to a work base, and said attaching step comprises a step of attaching a thin film member on said heat melting wax on said work base.

19. The method for adhering a member according to claim 18, wherein said thin film member is formed of a plurality of magnetic transducer elements, and said attaching step comprises a step of attaching said thin film member on said heat melting wax on said work base for lapping.

20. A magnetic transducer manufacturing method comprising:

a step of applying a heat melting wax to a fixed work base by moving application means while heating said fixed work base;

a step of attaching a row-bar formed of a plurality of magnetic transducer elements on said heat melting wax on said work base;

a step of lapping said row-bar on said work base;

a step of cutting said row-bar into said individual magnetic transducer elements; and a step of releasing said individual magnetic transducer elements from said work base by melting said heat melting wax.

\* \* \* \* \*